(12) United States Patent
Lee et al.

(10) Patent No.: US 12,026,032 B2
(45) Date of Patent: Jul. 2, 2024

(54) ELECTRONIC DEVICE AND METHOD FOR CONTROLLING POWER SUPPLY IN ELECTRONIC DEVICE

(71) Applicant: SAMSUNG ELECTRONICS CO., LTD., Suwon-si (KR)

(72) Inventors: Jehwan Lee, Suwon-si (KR); Kunsuk Kim, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 17/475,231

(22) Filed: Sep. 14, 2021

(65) Prior Publication Data

US 2022/0083117 A1 Mar. 17, 2022

Related U.S. Application Data

(63) Continuation of application No. PCT/KR2021/012467, filed on Sep. 14, 2021.

(30) Foreign Application Priority Data

Sep. 15, 2020 (KR) .................. 10-2020-0118292

(51) Int. Cl.
*G06F 1/32* (2019.01)
*G06F 1/16* (2006.01)
(Continued)

(52) U.S. Cl.
CPC ............ *G06F 1/325* (2013.01); *G06F 1/1677* (2013.01); *G06F 1/266* (2013.01); *G06F 1/3212* (2013.01); *H02J 7/00712* (2020.01)

(58) Field of Classification Search
CPC .................. G06F 1/16; G06F 1/26; G06F 1/32
See application file for complete search history.

(56) References Cited

U.S. PATENT DOCUMENTS

2004/0214601 A1 10/2004 Mok
2005/0156863 A1 7/2005 Kim
(Continued)

FOREIGN PATENT DOCUMENTS

JP 2007-527045 9/2007
KR 10-2004-0007056 1/2004
(Continued)

OTHER PUBLICATIONS

International Search Report and Written Opinion dated Dec. 21, 2021 in corresponding International Application No. PCT/KR2021/012467.

*Primary Examiner* — Paul B Yanchus, III
(74) *Attorney, Agent, or Firm* — Nixon & Vanderhye P.C.

(57) ABSTRACT

According to various embodiments, an electronic device may comprise: a connection circuit configured to connect to an external electronic device, a processor configured to: transmit, to a low power control circuit, a first control signal including power saving state information for the electronic device and a second control signal including charging enabled state information based on a power state of the electronic device being a power saving state, and a charging function setting state for the external electronic device being determined as a charging enabled state based on the external electronic device being connected to the connection circuit, and the low power control circuit being configured to cut off first power to a data input/output control circuit based on the power saving state information for the electronic device included in the first control signal and to supply second power to the external electronic device connected to the connection circuit based on the charging enabled state information included in the second control signal.

15 Claims, 15 Drawing Sheets

(51) Int. Cl.
*G06F 1/26* (2006.01)
*G06F 1/3212* (2019.01)
*G06F 1/3234* (2019.01)
*H02J 7/00* (2006.01)

(56) References Cited

U.S. PATENT DOCUMENTS

| | | | |
|---|---|---|---|
| 2006/0152484 A1 | 7/2006 | Rolus Borgward | |
| 2007/0067659 A1* | 3/2007 | Tevanian, Jr. | G06F 1/3215 |
| | | | 713/324 |
| 2008/0270809 A1* | 10/2008 | Hoffer | G06F 1/3253 |
| | | | 713/300 |
| 2011/0021247 A1 | 1/2011 | Shih | |
| 2011/0264931 A1* | 10/2011 | Chang | G06F 1/3209 |
| | | | 713/310 |
| 2015/0134990 A1* | 5/2015 | Masuda | G06F 1/263 |
| | | | 713/323 |
| 2015/0212497 A1 | 7/2015 | Dunstan | |
| 2015/0249356 A1 | 9/2015 | Cho et al. | |
| 2015/0256017 A1* | 9/2015 | Hays | H02J 50/80 |
| | | | 320/103 |
| 2015/0355696 A1* | 12/2015 | Pamley | G06F 1/3203 |
| | | | 713/300 |
| 2018/0314317 A1 | 11/2018 | Tsutsui | |
| 2020/0403433 A1 | 12/2020 | Chung et al. | |

FOREIGN PATENT DOCUMENTS

| | | |
|---|---|---|
| KR | 10-2005-0069007 | 7/2005 |
| KR | 10-2008-0050400 | 6/2008 |
| KR | 10-2019-0017119 | 2/2019 |
| KR | 10-2019-0061858 | 6/2019 |

* cited by examiner

ELECTRONIC DEVICE AND METHOD FOR CONTROLLING POWER SUPPLY IN ELECTRONIC DEVICE

CROSS-REFERENCE TO RELATED APPLICATIONS

This application is a continuation of International Application No. PCT/KR2021/012467 designating the United States, filed on Sep. 14, 2021, in the Korean Intellectual Property Receiving Office and claiming priority to Korean Patent Application No. 10-2020-0118292, filed on Sep. 15, 2020, in the Korean Intellectual Property Office, the disclosures of which are incorporated by reference herein in their entireties.

BACKGROUND

Field

The disclosure relates to an electronic device capable of cutting off power supply to a charging power port and a data communication port of a connection circuit for an external electronic device depending on a power state of the electronic device, and a method for controlling power supply in the electronic device.

Description of Related Art

An electronic device may supply charging power to an external electronic device via a charging power port of a connection circuit of the electronic device upon recognizing connection of the external electronic device through the connection circuit in a state in which a charging function has been activated to supply charging power to the external electronic device.

When the electronic device is in a power-on state, the electronic device may always supply power to a data input/output control circuit connected with a data communication port of the connection circuit and may perform data transmission/reception with the external electronic device connected to the connection circuit of the electronic device.

Although the power state of the electronic device switches to a power saving state or power-off state while the electronic device supplies charging power to the external electronic device connected to the connection circuit of the electronic device, if charging function enablement is set, the electronic device may supply charging power through the charging power port of the connection circuit connected with the external electronic device. However, if charging power is continuously supplied through the charging power port of the connection circuit connected with the external electronic device when the electronic device is in the power saving state or power-off state, the battery power of the electronic device may be rapidly consumed.

SUMMARY

Embodiments of the disclosure provide an electronic device capable of cutting off power supply to a charging power port and a data communication port of a connection circuit for an external electronic device depending on a power state of the electronic device, and a method for controlling power supply in the electronic device.

According to various example embodiments, an electronic device may comprise: a connection circuit configured to connect to an external electronic device, a processor configured to: transmit, to a low power control circuit, a first control signal including power saving state information for the electronic device and a second control signal including charging enabled state information based on a power state of the electronic device being a power saving state, wherein a charging function setting state of the external electronic device is determined as a charging enabled state based on the external electronic device being connected to the connection circuit, and the low power control circuit is configured to cut off first power to a data input/output control circuit based on the power saving state information for the electronic device included in the first control signal and to supply second power to the external electronic device connected to the connection circuit based on the charging enabled state information included in the second control signal.

According to various example embodiments, a method for controlling power supply by an electronic device comprises: determining a charging function setting state for an external electronic device and a power state of the electronic device based on the external electronic device being connected to a connection circuit of the electronic device and transmitting, to a low power control circuit of the electronic device, a first control signal including power saving state information for the electronic device and a second control signal including charging enabled state information based on the power state of the electronic device being a power saving state, wherein the charging function setting state for the external electronic device is determined as a charging enabled state. The first control signal including the power saving state information for the electronic device may be a signal to configure the low power control circuit to cut off first power to a data input/output control circuit connected with a data communication port of the connection circuit, and the second control signal including the charging enabled state information may be a signal to configure the low power control circuit to supply second power to the external electronic device.

According to various example embodiments, it is possible to prevent and/or reduce rapid power consumption of the battery of the electronic device by cutting off power supply to the charging power port and data communication port of the connection circuit for the external electronic device depending on the power state of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
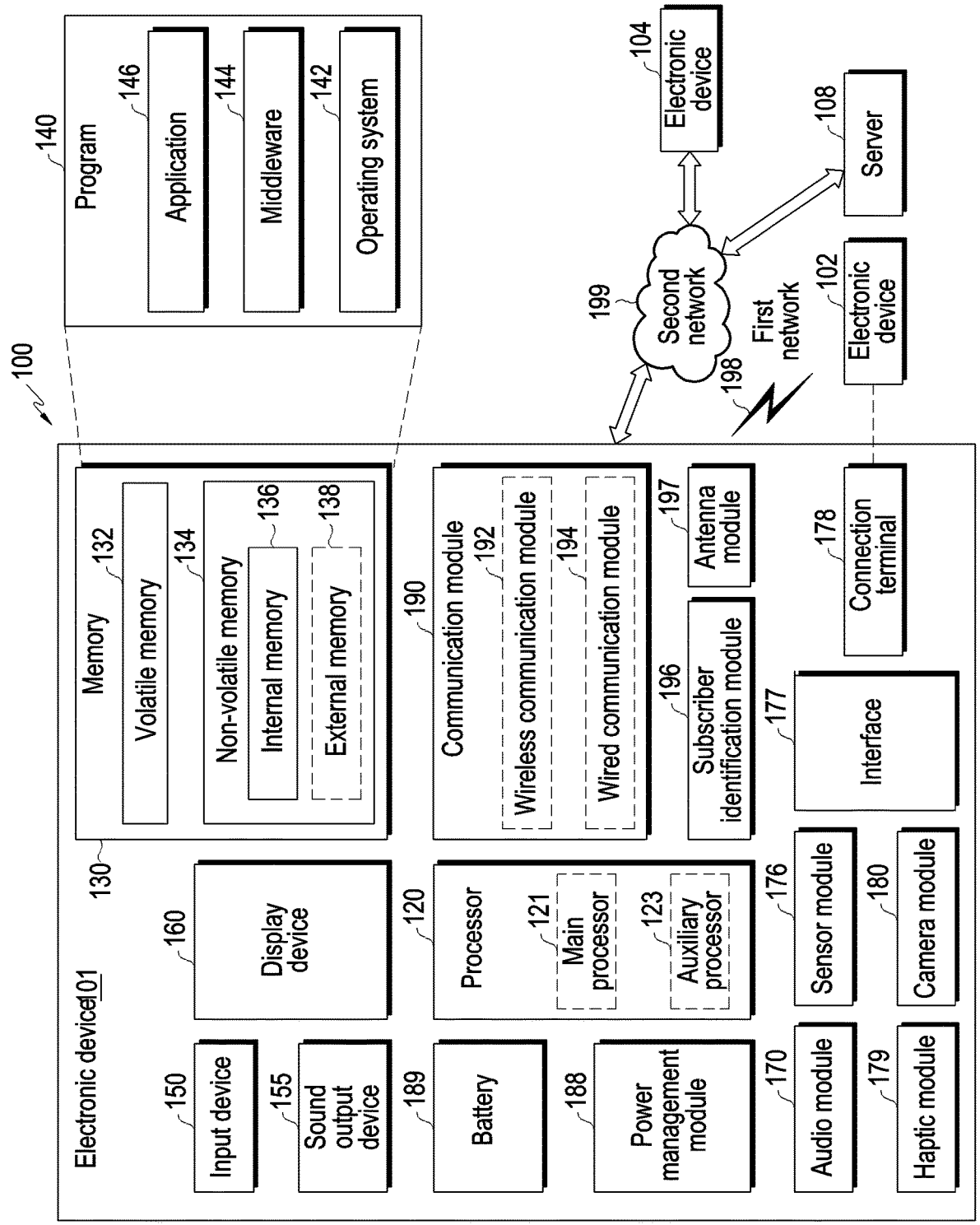
FIG. 1 is a block diagram illustrating an electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
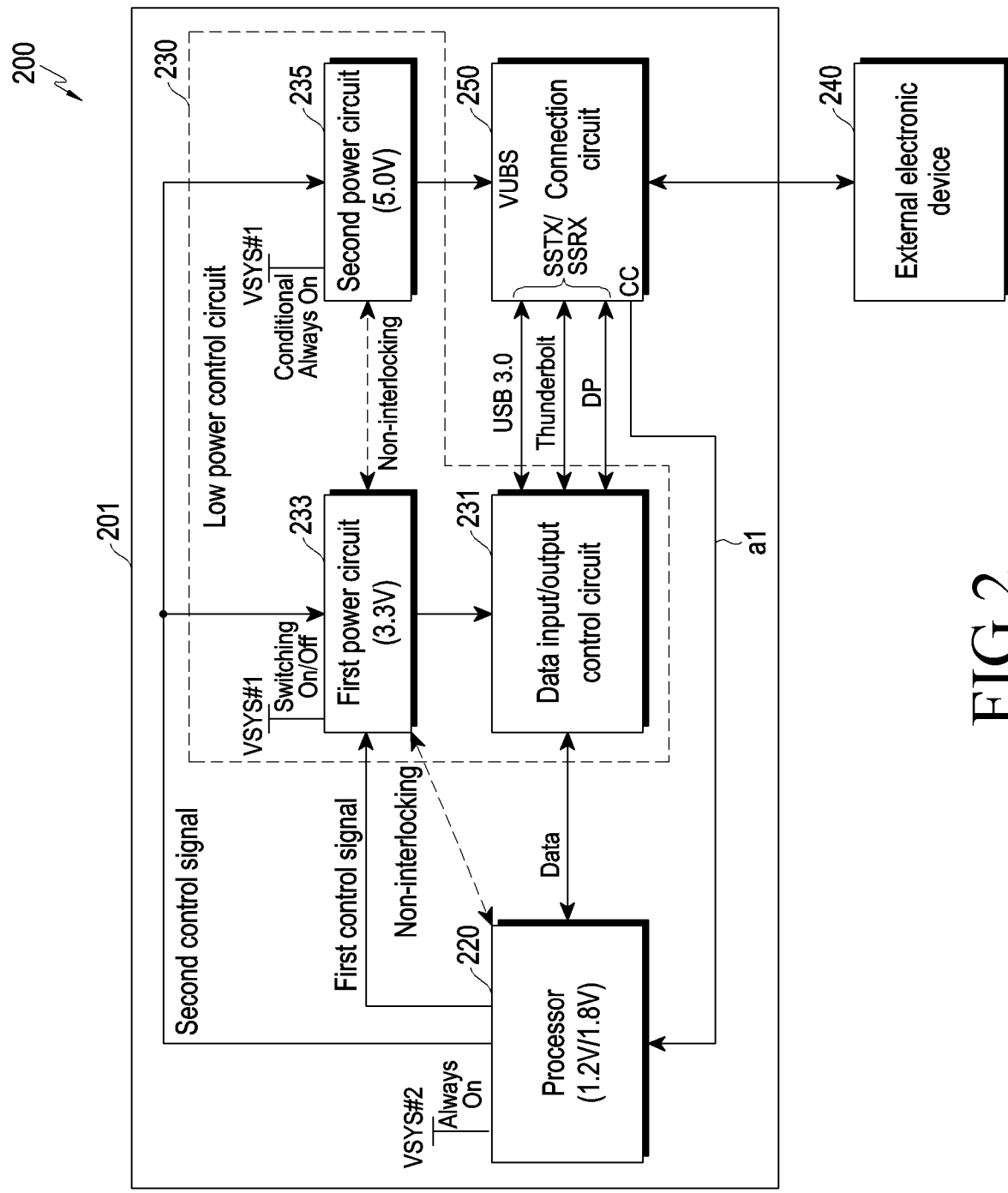
FIG. 2 is a block diagram illustrating an electronic device according to various embodiments.

FIG. 2 is a block diagram 200 illustrating an electronic device according to various embodiments.

Referring to FIG. 2, an electronic device 201 (e.g., the electronic device 101 of FIG. 1) may include a processor (e.g., including processing circuitry) 220, a low power control circuit 230, and a connection circuit 250.

According to various embodiments, the processor 220 (e.g., the processor 120 of FIG. 1) may include various processing circuitry and control the overall operation of the electronic device.

According to various embodiments, when the processor 220 (e.g., the processor 120 of FIG. 1) determines connection of an external electronic device 240 to the connection circuit 250 of the electronic device, the processor 220 may transmit, to the low power control circuit 230, a first control signal capable of controlling power to the data input/output control circuit 231 according to the power state of the electronic device 201 and a second control signal capable of controlling power to the external electronic device 240 connected to the connection circuit 250 according to a charging function setting state.

According to an embodiment, the processor 220 may determine the device type of the external electronic device connected to the connection circuit 250 and connection of the external electronic device to the connection circuit 250, based on the voltage value according to the terminating resistance received through an identification line al (e.g., a CC line) connected with an external electronic device identification port (e.g., CC) of the connection circuit 250. If the device type of the external electronic device connected to the connection circuit 250 is identified as a charging receiving device, the processor 220 may determine the power state of the electronic device and the charging function setting state of the electronic device.

According to an embodiment, the processor 220 may transmit a first control signal corresponding to the power state of the electronic device to the low power control circuit 230 in a state in which connection of the external electronic device 240 is recognized.

According to an embodiment, if the power state of the electronic device 201 is determined as a display (e.g., the display 160 of FIG. 1) on state in the power-on state, the processor 220 may transmit, to the low power control circuit 230, a first control signal including active state information for the electronic device for supplying first power to the data input/output control circuit 231. If the power state of the electronic device 201 is determined as a display (e.g., the display 160 of FIG. 1) off, power saving state in the power-on state, the processor 220 may transmit, to the low power control circuit 230, a first control signal including power saving state information for the electronic device to cut off the first power to the data input/output control circuit 231. For example, the power saving state may include a modern standby mode S0ix in which network connection may be maintained in the power saving state, a power on suspend mode S1 in which information in the memory and CPU is maintained, and power supply to the disk, monitor, or other input/output devices is cut off while power is supplied to core components, such as CPU, RAM, and VGA, a sleep mode S3 in which the main memory is not turned off, but most of the other devices are cut off from power supply, and a hibernate mode S4, also called maximum power saving mode, in which all of the devices are cut off from power supply. If the power state of the electronic device 201 is determined as the power-off state, the processor 220 may transmit, to the low power control circuit 230, a first control signal including power-off state information for the electronic device to cut off the first power to the data input/output control circuit 231.

According to an embodiment, the processor 220 may transmit, to the low power control circuit 230, a second control signal corresponding to the charging function setting state in the state in which connection of the external electronic device 240 is recognized.

According to an embodiment, if the processor 220 recognizes connection of the external electronic device and determines that the charging function setting state of the electronic device, set by the user, is a charging enabled (e.g., on) state, the processor 220 may transmit, to the low power control circuit 230, a second control signal including charging enabled state information for supplying the second power to the charging power port (e.g., VBUS) of the connection circuit 250 connected with the external electronic device 240 in the state in which connection of the external electronic device is recognized. If the processor 220 determines that the charging function setting state of the electronic device is a charging disabled (e.g., off) state, the processor 220 may transmit, to the low power control circuit 230, a second control signal including charging disabled state information for cutting off power supply to the charging power port (e.g., VBUS) of the connection circuit connected with the external electronic device 240.

According to an embodiment, the processor 220 may transmit, to the low power control circuit 230, a first control signal corresponding to the power state of the electronic device and a second control signal corresponding to the charging function setting state in the state in which connection of the external electronic device is recognized as illustrated by way of example in Table 1 below, thereby controlling whether to supply power to the data input/output control circuit 231 and whether to supply power to the external electronic device 240.

TABLE 1

| first control signal | second control signal | first power | second power |
|---|---|---|---|
| active state | charging enabled (ON) | ON | ON |
| power saving state | charging enabled (ON) | OFF | ON |
| power-off state | charging enabled (ON) | OFF | ON |

As shown in Table 1 above, the processor 220 may transmit, to the low power control circuit 230, the first control signal including the active state information according to the power state of the electronic device and the second control signal including the charging enabled (on) state according to the charging function setting state of the electronic device in the state in which connection of the external electronic device 240 is recognized, thereby controlling to supply the first power (e.g., 3.3V) for the data communication port of the connection circuit 250 through the first power circuit 233 and the second power (e.g., 5.0V) for the charging power port (e.g., VBUS) of the connection circuit 250 through the second power circuit 235. The processor 220 may transmit, to the low power control circuit 230, the first control signal including the power saving state information according to the power state of the electronic device and the second control signal including the charging enabled (on) state information according to the charging function setting state of the electronic device in the state in which connection of the external electronic device 240 is recognized, thereby controlling to cut off the first power (e.g., 3.3V) for the data communication port of the connection circuit 250 through the first power circuit 233 and to supply the second power (e.g., 5.0V) for the charging power port (e.g., VBUS) of the connection circuit 250 through the second power circuit 235. The processor 220 may transmit, to the low power control circuit 230, the first control signal including the power-off state information according to the power state of the electronic device and the second control signal including the charging enabled state information according to the charging function setting state of the electronic device in the state in which connection of the external electronic device 240 is recognized, thereby controlling to cut off the first power (e.g., 3.3V) for the data communication port of the connection circuit 250 through the first power circuit 233 and to supply the second power (e.g., 5.0V) for the charging power port (e.g., VBUS) of the connection circuit 250 through the second power circuit 235.

According to various embodiments, as illustrated by way of example in Table 2 below, the electronic device may non-interlockingly control power supply to the low power control circuit 230 and power supply to the processor 220, corresponding to the connection state of the external electronic device and the charging function setting state, and the power state.

TABLE 2

| first control signal | second control signal | first power | second power | third power |
|---|---|---|---|---|
| active state | charging enabled (ON) | ON | ON | ON |
| power saving state | charging enabled (ON) | OFF | ON | ON |
| power-off state | charging enabled (ON) | OFF | ON | OFF |

As shown in Table 2 above, when the electronic device 201 recognizes connection of the external electronic device 240, and the power state of the electronic device 201 is the power-off state, supply of third power (e.g., 1.2V/1.8V) for the processor 220 is cut off, and the low power control circuit 230, which receives the first control signal including the power-off state information for the electronic device and the second control signal including the charging enabled (on) state information according to the charging function setting state of the electronic device, may control to cut off the first power (e.g., 3.3V) for the data communication port of the connection circuit 250 through the first power circuit 233 and to supply the second power (e.g., 5.0V) for the charging power port (e.g., VBUS) of the connection circuit 250 through the second power circuit 235. When the electronic device 201 recognizes connection of the external electronic device 240, and the power state of the electronic device 201 is the active state, the processor receiving the third power (e.g., 1.2V/1.8V) may transmit, to the low power control circuit 230, the first control signal including the active state information for the electronic device and the second control signal including the charging enabled (on) state information according to the charging function setting state of the electronic device, thereby controlling to supply the first power (e.g., 3.3V) for the data communication port of the connection circuit 250 through the first power circuit 233 and to supply the second power (e.g., 5.0V) for the charging power port (e.g., VBUS) of the connection circuit 250 through the second power circuit 235. When the electronic device 201 recognizes connection of the external electronic device 240, and the power state of the electronic device 201 is the power saving state, the processor 220 receiving the third power (e.g., 1.2V/1.8V) may transmit, to the low power control circuit 230, the first control signal including the power saving state information for the electronic device and the second control signal including the charging enabled (on) state information according to the charging function setting state of the electronic device, thereby controlling to cut off the first power (e.g., 3.3V) for the data communication port of the connection circuit 250 through the first power circuit 233 and to supply the second power (e.g., 5.0V) for the charging power port (e.g., VBUS) of the connection circuit 250 through the second power circuit 235.

According to various embodiments, the low power control circuit 230 may include the data input/output control circuit 231, the first power circuit 233, and the second power circuit 235.

According to various embodiments, the data input/output control circuit 231, the first power circuit 233, and the second power circuit 235 may be a power circuit configured as a single integrated controller, and may include a micro controller unit (MCU) and may include a power circuit including, for example, and without limitation, at least one regulator (e.g., low dropout (LDO)), a controller (e.g., a switch), a step-down converter (e.g., a buck converter), a step-up converter (e.g., a boost converter), or the like.

According to various embodiments, the data input/output circuit 231 may be connected to a high-speed data communication port (e.g., SSTX and SSRX) among a plurality of ports included in the connection circuit 250 to perform the function of high-rate data transmission/reception between the processor 220 and the external electronic device 240 connected to the connection circuit 250.

According to an embodiment, the data input/output circuit 231 may include, for example, a burnside bridge circuit including a switching circuit connected with the data communication port of the processor 220, and the output of the burnside bridge circuit may be connected with the data communication port of the connection circuit 250.

According to an embodiment, the data input/output circuit 231 may include, for example, a retimer&bridge circuit capable of adjusting timing to ensure integrity of a plurality of data communication signals (e.g., Thunderbolt, USB, or DP) having different data formats. According to an embodiment, the data input/output circuit 231 may include, for example, a display port (DP) interface and a Thunderbolt interface as well as a USB (e.g., USB 3.0) interface.

According to various embodiments, the first power circuit 233 may control the first power to the data input/output circuit 231 based on the first control signal and the second control signal received from the processor 220.

According to an embodiment, if the charging function setting state information included in the second control signal received from the processor 220 is determined as the charging enabled state information, the first power circuit 233 may identify information included in the first control signal received from the processor 220.

According to an embodiment, the first power circuit 233 may supply the first power (e.g., 3.3V) for the data input/output control circuit 231, in response to the first control signal including the active state information for the electronic device received from the processor 220. The first power circuit 233 may cut off the first power (e.g., 3.3V) for the data input/output control circuit 231, in response to the first control signal including the power saving state information for the electronic device received from the processor 220. The first power circuit 233 may cut off the first power (e.g., 3.3V) for the data input/output control circuit 231, in response to the first control signal including the power off information for the electronic device received from the processor 220.

According to various embodiments, the second power circuit 235 may control to supply or cut off the charging power to the external electronic device 240 connected to the connection circuit 250 based on the second control signal received from the processor 220.

According to an embodiment, the second power circuit 235 may supply the charging power to the external electronic device 240 connected to the connection circuit 250 by supplying the second power (e.g., 5.0V) for the charging power port (e.g., VBUS) of the connection circuit 250, in response to the second control signal including the charging enabled state information for the electronic device received from the processor 220. The second power circuit 235 may cut off the supply of charging power to the external electronic device 240 connected to the connection circuit 250 by cutting off supply of the second power (e.g., 5.0V) for the charging power port (e.g., VBUS) of the connection circuit 250, in response to the second control signal including the charging disabled state information for the electronic device received from the processor 220.

According to various embodiments, the connection circuit 250 (e.g., the connection terminal 178 of FIG. 2) may include a USB interface capable of electrical connection of the external electronic device 240.

According to an embodiment, the connection circuit 250 may include a cable connection interface configured with a plurality of pins (e.g., 24 pins), for example, a type-C receptacle. The cable connected to the connection circuit 250 may include a type-C to DP cable and a type-C to Thunderbolt cable, and the USB cable may include a type-C to type-C and a type-C to type-A cable.

According to an embodiment, among the plurality of ports corresponding to the plurality of pins included in the connection circuit 250, the high-speed data communication ports (e.g., SSTX and SSRX) is connected to the data input/output circuit 231 capable of transmitting/receiving data between the electronic device 201 and the external electronic device 240.

According to an embodiment, among the plurality of ports corresponding to the plurality of pins included in the connection circuit 250, the charging power port (e.g., VBUS) is connected with the second power circuit 235 capable of supplying power to the external electronic device 240 connected to the connection circuit 250.

According to an embodiment, the connection circuit 250 may include 24 pins as shown in Table 3 below.

TABLE 3

| Pin | Name | Description | Pin | Name | Description |
|---|---|---|---|---|---|
| A1 | GND | Ground return | B12 | GND | Ground return |
| A2 | SSTXp1 | SuperSpeed differential pair #1, TX, positive | B11 | SSRXp1 | SuperSpeed differential pair #2, RX, positive |
| A3 | SSTXn1 | SuperSpeed differential pair #1, TX, negative | B10 | SSRXn1 | SuperSpeed differential pair #2, RX, negative |
| A4 | VBUS | Bus power | B9 | VBUS | Bus power |
| A5 | CC1 | Configuration channel | B8 | SBU2 | Sideband use (SBU) |
| A6 | Dp1 | Non-SuperSpeed differential pair, position 1, positive | B7 | Dn2 | Non-SuperSpeed differential pair, position 2, negative |

TABLE 3-continued

| Pin | Name | Description | Pin | Name | Description |
|---|---|---|---|---|---|
| A7 | Dn1 | Non-SuperSpeed differential pair, position 1, negative | B6 | Dp2 | Non-SuperSpeed differential pair, position 2, positive |
| A8 | SBU1 | Sideband use (SBU) | B5 | CC2 | Configuration channel |
| A9 | VBUS | Bus power | B4 | VBUS | Bus power |
| A10 | SSRXn2 | SuperSpeed differential pair #4, RX, negative | B3 | SSTXn2 | SuperSpeed differential pair #3, TX, negative |
| A11 | SSRXp2 | SuperSpeed differential pair #4, RX, positive | B2 | SSTXp2 | SuperSpeed differential pair #3, TX, positive |
| A12 | GND | Ground return | B1 | GND | Ground return |

According to an embodiment, in Table 3, pin A2 (SSTXp1), pin A3 (SSTXn1), pin A10 (SSRXn2), and pin A11 (SSRXp2), and pin B2 (SSTXp2), pin B3 (SSTXn2), pin B10 (SSRXn1), and pin B11 (SSRXp1) of the connection circuit 250 are connected to the data input/output circuit 231 capable of transmitting and receiving data between the electronic device 201 and the external electronic device 240. According to an embodiment, in Table 3, pin A4 (VBUS) and pin B9 (VBUS) of the connection circuit 250 are connected with the second power circuit 235 capable of supplying power to the external electronic device 240 connected to the connection circuit 250.

According to an embodiment, the voltage value according to the terminating resistance (e.g., Rd) received from the external electronic device 240 connected to the connection circuit 250 may be transmitted to the processor 220 through pin A5 (CC1) or pin B5 (CC2) of the connection circuit 250. If receiving the voltage value according to the terminating resistance (e.g., Rd) through pin A5 (CC1) or pin B5 (CC2) of the connection circuit 250 based on Table 4 below, the processor 220 may identify that the external electronic device 240 connected to the connection circuit 250 is a charging receiving device (e.g., an external electronic device having an upstream-facing port (UFP)). The charging receiving device (e.g., an external electronic device having a UFP) may include a smartphone, auxiliary battery, display device, laptop, tablet connected through the USB cable and/or a plurality of USB devices connected through the USB adapter.

TABLE 4

| CC1 | CC2 | State |
|---|---|---|
| Open | Open | Nothing attached |
| Rd | Open | UFP attached |
| Open | Rd | |
| Open | Ra | Power cable/No Device attached |
| Ra | Open | |
| Rd | Ra | Power cable/Device attached |
| Ra | Rd | |
| Rd | Rd | Debug Accessory Mode attached (Appendix B) |
| Ra | Ra | Audio Adapter Accessory Mode attached (Appendix A) |

Figure 3:
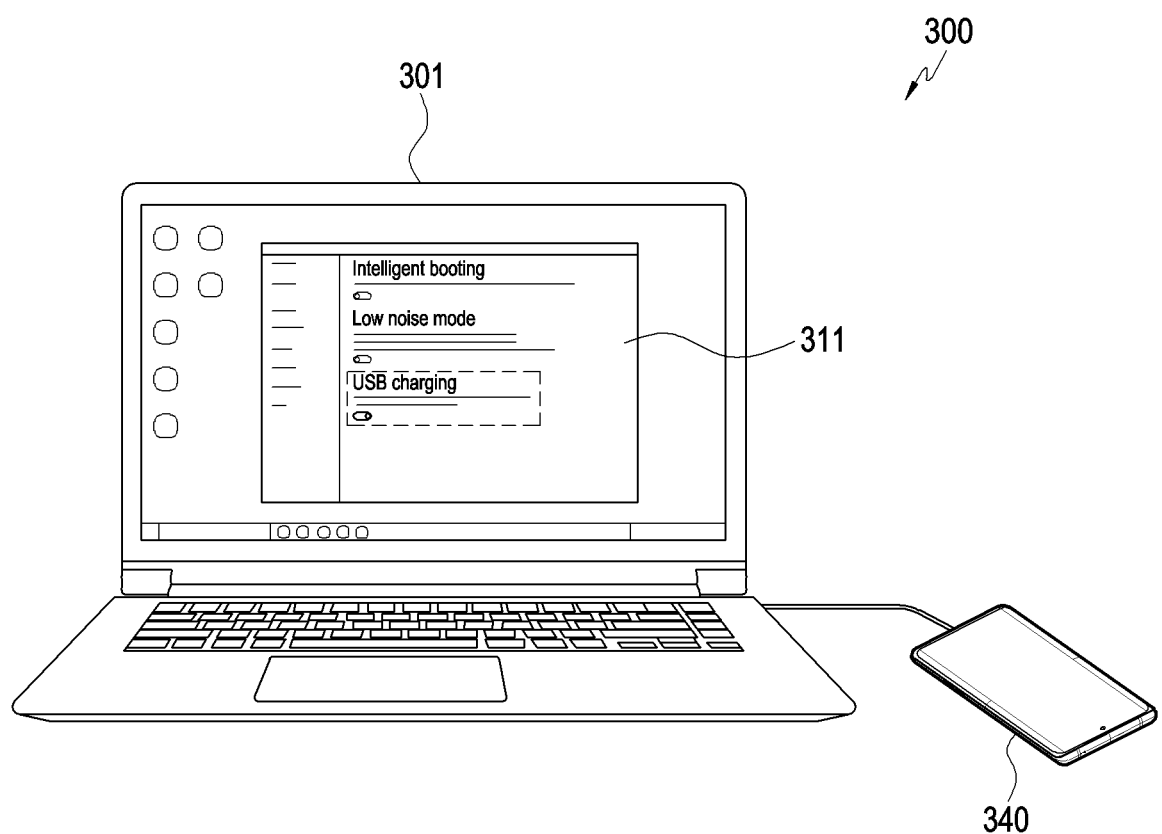
FIG. 3 is a diagram illustrating an example charging function setting state for an external electronic device in an electronic device according to various embodiments.

FIG. 3 is a diagram 300 illustrating an example charging function setting state for an external electronic device in an electronic device according to various embodiments.

Referring to FIG. 3, an electronic device 301 (e.g., the electronic device 101 of FIG. 1 and/or the electronic device 201 of FIG. 2) may switch the charging function setting state of the electronic device into the charging enabled (e.g., on) state if the user sets charging enablement (e.g., on) for supplying charging power to an external electronic device 340 connected to the electronic device 301, through a system configuration interface 311. The electronic device 301 may switch the charging function setting state of the electronic device into a charging disabled (e.g., off) state if the user sets charging disablement (e.g., off) for cutting off supply of charging power to the external electronic device 340 connected to the electronic device 301, through the system configuration interface 311 of the electronic device 301.

Figure 4:
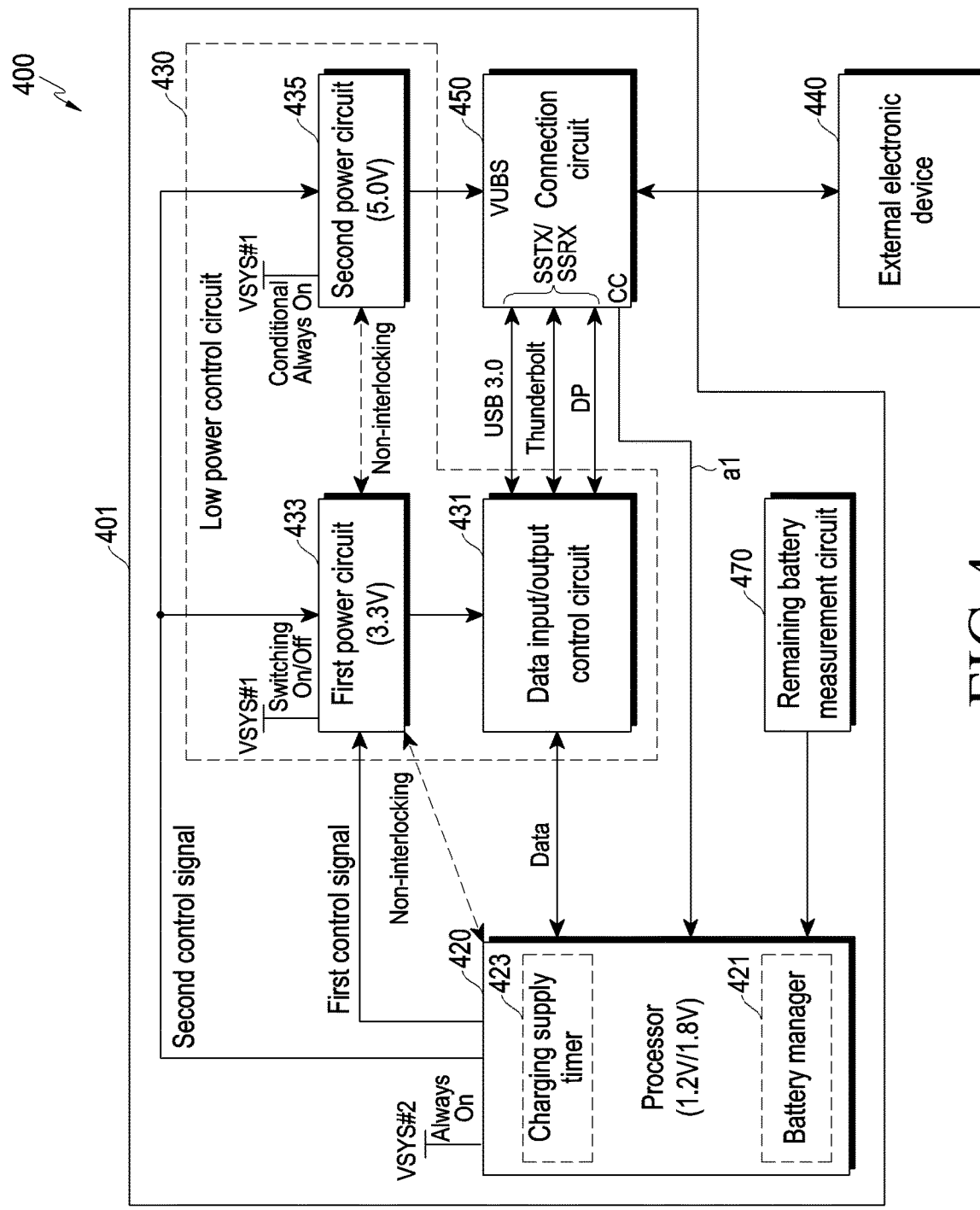
FIG. 4 is a block diagram illustrating an electronic device according to various embodiments.

FIG. 4 is a block diagram 400 illustrating an electronic device according to various embodiments.

Referring to FIG. 4, an electronic device 401 (e.g., the electronic device 101 of FIG. 1) may include a processor (e.g., including processing circuitry) 420, a low power control circuit 430, a connection circuit 450, and a remaining battery measurement circuit 470.

According to various embodiments, the processor 420 (e.g., the processor 120 of FIG. 1) may include various processing circuitry and control the overall operation of the electronic device.

According to various embodiments, the processor 420 (e.g., the processor 120 of FIG. 1) may include a battery manager 421 capable of controlling charging power to the external electronic device according to the remaining battery level of the electronic device and a charging supply timer 423 capable of controlling charging power to the external electronic device according to time.

According to various embodiments, the processor 420 (e.g., the processor 120 of FIG. 1) may determine the connection state of the external electronic device 440 for the connection circuit 450 of the electronic device and may transmit, to the low power control circuit 430, a first control signal capable of controlling first power to the data input/output control circuit 431 and a second control signal capable of controlling second power to the external electronic device 440 connected to the connection circuit 450 according to the charging function setting state, based on the power state of the electronic device 401, the charging function setting state of the electronic device 401, and the current remaining battery level of the electronic device 401.

According to an embodiment, the processor 420 may determine the device type of the external electronic device and the connection state for the external electronic device to the connection circuit 450, based on the voltage value according to the terminating resistance (e.g., Rd) received through an identification line al (e.g., a CC line) connected with an external electronic device identification port (e.g., CC) of the connection circuit 450. If the device type of the external electronic device connected to the connection circuit 450 is identified as a charging receiving device, the processor 420 may determine the power state of the electronic device and the charging function setting state of the electronic device.

According to an embodiment, if the power state of the electronic device 401 is the active state, and the charging function setting state of the electronic device set by the user is determined as the charging enabled (on) state, and then the remaining battery level measured by the remaining battery measurement circuit 470 is determined as not less than a threshold (e.g., 30%), the processor 420 may transmit, to the low power control circuit 430, the first control signal including the active state information for the electronic device to supply the first power to the data input/output control circuit 431 and the second control signal including the charging enabled state information for supplying the second power to the charging power port (e.g., VBUS) connected with the external electronic device 440.

According to an embodiment, if the power state of the electronic device 401 is the active state, the charging function setting state of the electronic device set by the user is determined as the charging enabled (on) state, and then the remaining battery level measured by the remaining battery measurement circuit 470 is determined as not more than the threshold (e.g., 30%), the processor 420 may switch the charging function setting state of the electronic device from the charging enabled (on) state to the charging disabled (off) state. The processor 420 may transmit, to the low power control circuit 430, the first control signal including the active state information for the electronic device for supplying the first power to the data input/output control circuit 431 and the second control signal including charging disabled state information for cutting off the second power to the charging power port (e.g., VBUS) of the connection circuit connected with the external electronic device 440.

According to an embodiment, if the power state of the electronic device 401 is the power saving state or the power-off state, and the charging function setting state of the electronic device set by the user is determined as the charging enabled (on) state, and then the remaining battery level measured by the remaining battery measurement circuit 470 is determined as not less than the threshold, the processor 420 may transmit, to the low power control circuit 430, the first control signal including the power-off state information for the electronic device or the power saving state information for the electronic device for cutting the first power to the data input/output control circuit 431 and the second control signal including the charging enabled (on) state information for supplying the second power to the charging power port (e.g., VBUS) of the connection circuit 450 connected with the external electronic device 440.

According to an embodiment, if the power state of the electronic device 401 is the power saving state or the power-off state, the charging function setting state of the electronic device set by the user is determined as the charging enabled (on) state, and then the remaining battery level measured by the remaining battery measurement circuit 470 is determined as not more than the threshold, the processor 420 may switch the charging function setting state of the electronic device from the charging enabled (on) state to the charging disabled (off) state. The processor 420 may transmit, to the low power control circuit 430, the first control signal including the power saving state information for the electronic device for cutting the first power to the data input/output control circuit 431 or the power-off state information for the electronic device and the second control signal including charging disabled state information for cutting off the second power to the charging power port (e.g., VBUS) of the connection circuit connected with the external electronic device 440.

According to an embodiment, the processor 420 may automatically switch the charging function setting state from the charging enabled (on) state to the charging disabled (off) state depending on the remaining battery level as illustrated by way of example in Table 5 below and transmit the second control signal including the charging disabled state information to the low power control circuit 430.

TABLE 5

| remaining battery level | first control signal | second control signal | first power | second power |
| --- | --- | --- | --- | --- |
| 31% to 100% | power saving state | charging enabled (ON) | OFF | ON |
| 0% to 30% | power saving state | charging disabled (OFF) | OFF | OFF |

As shown in Table 5 above, if the remaining battery level falls within the range from 31% to 100%, which is the threshold or more, when the power state of the electronic device is the power saving state, and the charging function setting state of the electronic device is the charging enabled (on) state in the state in which connection of the external electronic device 440 is recognized, the processor 420 may transmit, to the low power control circuit 430, the first control signal including the power saving state information for the electronic device for cutting the first power (e.g., 3.0V) for the data input/output control circuit 431 and the second control signal including the charging enabled (on) state information for supplying the second power (e.g., 5.0V) to the charging power port (e.g., VBUS) of the connection circuit 450 connected with the external electronic device 440. If the remaining battery level falls within the range from 0% to 30%, which may be the threshold or less, when the power state of the electronic device is the power saving state, and the charging function setting state of the electronic device is the charging enabled (on) state in the state in which connection of the external electronic device 400 is recognized, the processor 420 may automatically switch the charging function setting state of the electronic device from the charging enabled (on) state to the charging disabled (off) state and transmit, to the low power control circuit 430, the first control signal including the power saving state information for the electronic device for cutting off the first power (e.g., 3.0V) for the data input/output control circuit 431 and the second control signal including the charging disabled (off) state information for cutting off the second power (e.g., 5.0V) for the charging power port (e.g., VBUS) of the connection circuit 450 connected with the external electronic device 440.

According to various embodiments, if charging power supply to the external electronic device 440 connected to the connection circuit 450 starts, the processor 420 (e.g., the processor 120 of FIG. 1) may start a charging supply timer 423 and, if the charging supply timer 423 expires, cut off the charging power supply to the external electronic device 440 connected to the connection circuit 450.

According to an embodiment, the processor 420 may start the charging supply timer 423 upon transmitting, to the low power control circuit 430, the first control signal including the power saving state information for the electronic device for cutting off the first power to the data input/output control circuit 431 and the second control signal including charging enabled (on) state information for supplying the second power to the charging power port (e.g., VBUS) of the connection circuit 450 connected with the external electronic device 440.

According to an embodiment, if determining that the charging supply timer 423 expires, the processor 420 may automatically switch the charging function setting state of the electronic device from the charging enabled (on) state to the charging disabled (off) state and transmit, to the low power control circuit 430, the second control signal including the charging disabled (off) state information for cutting off the second power to the charging power port (e.g., VBUS) of the connection circuit 450 connected with the external electronic device 440.

According to an embodiment, the processor 420 may automatically switch the charging function setting state from the charging enabled (on) state to the charging disabled (off) state as the charging supply timer expires as illustrated by way of example in Table 6 below and transmit the second control signal including the charging disabled state information to the low power control circuit 430.

TABLE 6

| charging supply timer | first control signal | second control signal | first power | second power |
|---|---|---|---|---|
| ON (working) | power state saving | charging enabled (ON) | OFF | ON |
| OFF (expired) | power state saving | charging disabled (OFF) | OFF | OFF |

As shown in Table 6, if the charging supply timer 423 is operating (on) when the power state of the electronic device is the power saving state, and the charging function setting state of the electronic device is the charging enabled (on) state, the processor 420 may transmit, to the low power control circuit 430, the first control signal including the power saving state information for the electronic device for cutting off the first power (e.g., 3.0V) for the data input/output control circuit 431 and the second control signal including the charging enabled (on) state information for supplying the second power (e.g., 5.0V) for the charging power port (e.g., VBUS) of the connection circuit 450 connected with the external electronic device 440. If the charging supply timer 423 expires and thus does not operate (off) when the power state of the electronic device is the power saving state, and the charging function setting state of the electronic device is the charging enabled (on) state, the processor 420 may automatically switch the charging function setting state of the electronic device from the charging enabled (on) state to the charging disabled (off) state and transmit, to the low power control circuit 430, the first control signal including the power saving state information for the electronic device for cutting off the first power (e.g., 3.0V) for the data input/output control circuit 431 and the second control signal including the charging disabled (off) state information for cutting off the second power (e.g., 5.0V) for the charging power port (e.g., VBUS) of the connection circuit 450 connected with the external electronic device 440. If the charging function setting state for the external electronic device 440 is changed by system rebooting of the electronic device or the user's settings, the processor 420 may reset the charging supply timer to the initial state.

According to various embodiments, the low power control circuit 430 may include a data input/output control circuit 431, a first power circuit 433, and a second power circuit 435.

According to various embodiments, the data input/output control circuit 431 may perform the same or similar function as the data input/output control circuit 231 of FIG. 2.

According to various embodiments, the first power circuit 433 may operate in the same or similar manner as the first power circuit 233 of FIG. 2 and control the first power to the data input/output circuit 231 based on the first control signal and the second control signal received from the processor 220.

According to an embodiment, if the charging function setting state information included in the second control signal received from the processor 420 is determined as the charging enabled state information, the first power circuit 433 may identify information included in the first control signal received from the processor 420.

According to an embodiment, if the first control signal including the active state information for the electronic device is received from the processor 420, the first power to the data input/output control circuit 431 may be supplied and, if the first control signal including the power saving state information for the electronic device or the power-off state information for the electronic device is received from the processor 420, the first power to the data input/output control circuit 431 may be cut off.

According to various embodiments, the second power circuit 435 may operate in the same or similar manner as the second power circuit 235 of FIG. 2. If the second control signal including the charging enabled state information is received from the processor 420, the second power to the charging power port (e.g., VBUS) of the connection circuit 450 connected with the external electronic device 440 may be supplied and, if the second control signal including the charging disabled state information for the electronic device is received from the processor 420, the second power to the charging power port (e.g., VBUS) of the connection circuit 450 connected with the external electronic device 440 may be cut off.

According to various embodiments, the connection circuit 450 may perform the same or similar function as the connection circuit 250 of FIG. 2.

According to various embodiments, the remaining battery measurement circuit 470 may measure the power of the battery and provide the measured battery power to the processor 420.

According to an embodiment, the remaining battery measurement circuit 470 may include fuel gauge circuitry.

Figure 5A:
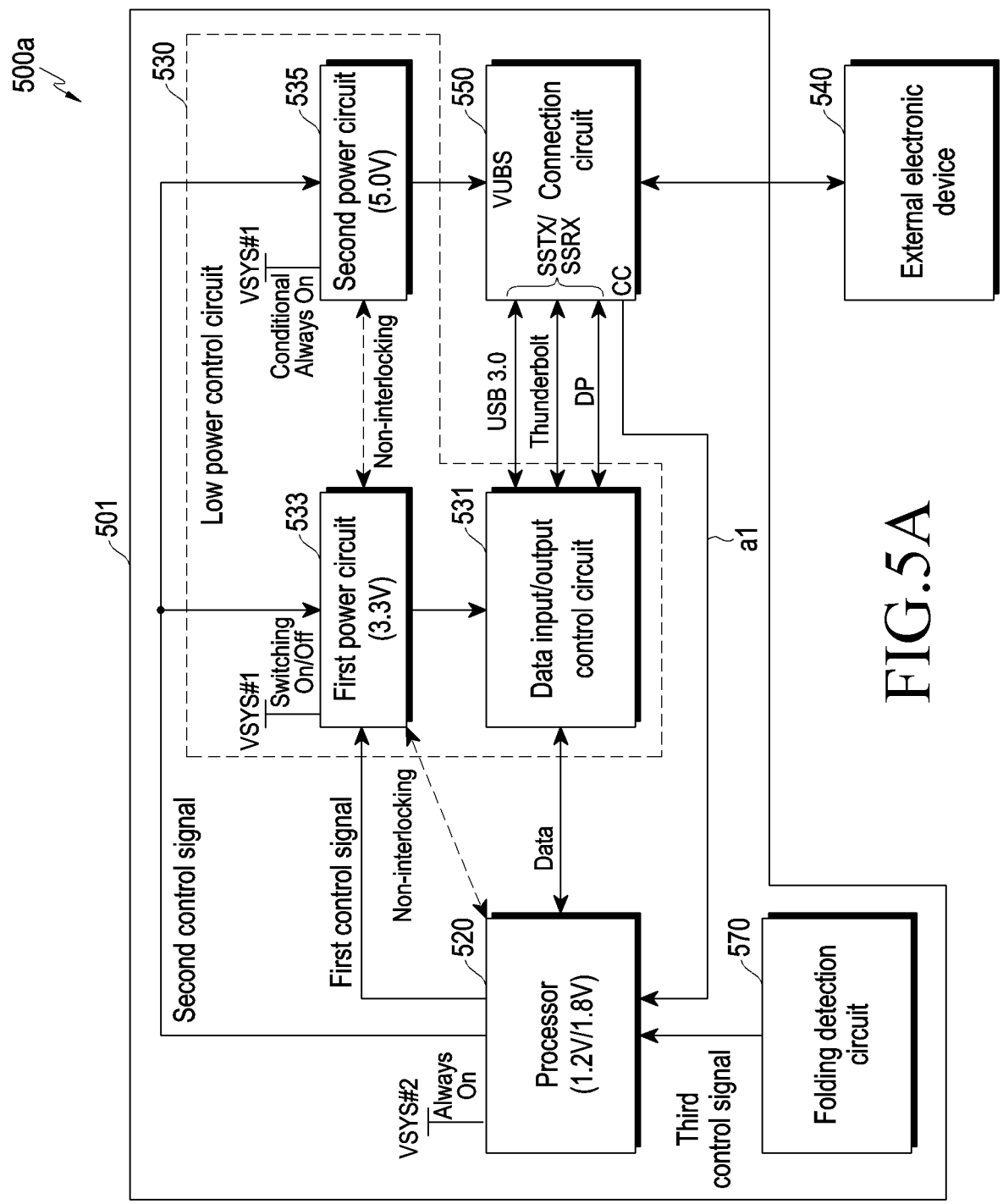
FIG. 5A is a block diagram illustrating an electronic device according to various embodiments.
Figure 5B:
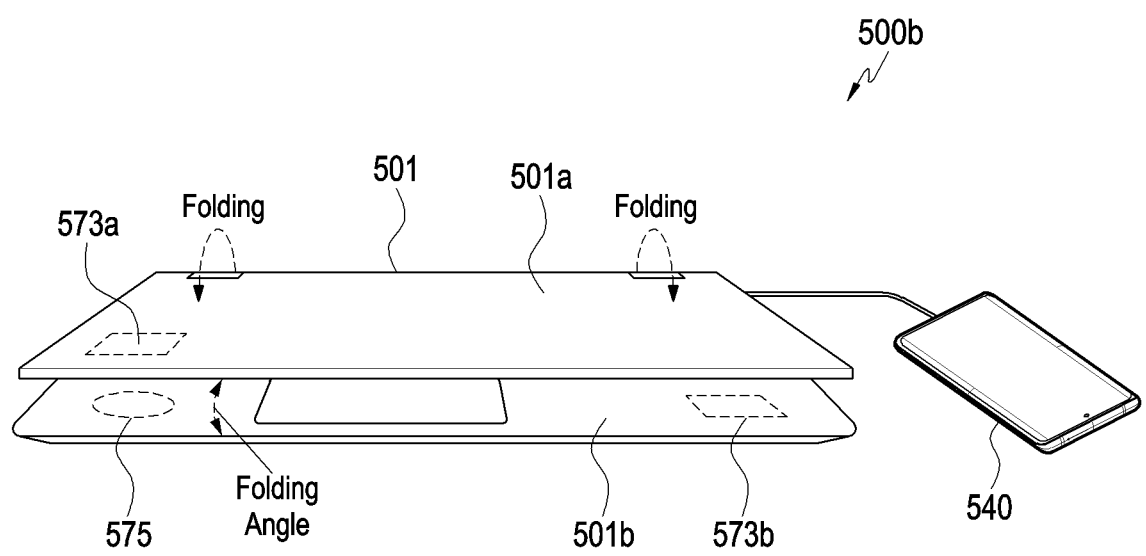
FIG. 5B is a diagram illustrating an example folding detection circuit in an electronic device according to various embodiments.

FIG. 5A is a block diagram 500a illustrating an electronic device according to various embodiments. FIG. 5B is a diagram 500b illustrating an example folding detection circuit in an electronic device according to various embodiments.

Referring to FIG. 5A, an electronic device 501 (e.g., the electronic device 101 of FIG. 1) may include a processor (e.g., including processing circuitry) 520, a low power control circuit 530, a connection circuit 550, and a folding detection circuit 570.

According to various embodiments, the processor 520 (e.g., the processor 120 of FIG. 1) may include various processing circuitry and control the overall operation of the electronic device.

According to various embodiments, the processor 520 (e.g., the processor 201 of FIG. 1) may determine the connection state of an external electronic device 540 for a connection circuit 550 of the electronic device and may transmit, to a low power control circuit 530, a first control signal capable of controlling first power to a data input/output control circuit 531 determined based on a third control signal received from the folding detection circuit 570 and a second control signal capable of controlling second power to the external electronic device 540 connected to the connection circuit 550 according to the charging function setting state.

According to an embodiment, the processor 520 may determine the device type of the external electronic device and the connection state for the external electronic device for the connection circuit 550, based on the voltage value according to the terminating resistance received through an identification line al (e.g., a CC line) connected with an external electronic device identification port (e.g., CC) of the connection circuit 550. Upon identifying that the device type of the external electronic device connected to the connection circuit 550 is a charging receiving device, the processor 520 may determine the charging function setting state of the electronic device and the folding state and/or unfolding state of the electronic device based on the third control signal received from the folding detection circuit 570.

According to an embodiment, upon determining that the electronic device is in the unfolding state based on the third control signal received from the folding detection circuit 570, the processor 520 may transmit, to the low power control circuit 530, the first control signal for supplying the first power to the data input/output control circuit 531. Upon determining that the electronic device is in the folding state based on the third control signal received from the folding detection circuit 570, the processor 520 may transmit, to the low power control circuit 530, the first control signal for cutting off the first power to the data input/output control circuit 531.

According to an embodiment, if the processor 520 determines that the charging function setting state of the electronic device, set by the user, is a charging enabled (on) state, the processor 520 may transmit, to the low power control circuit 530, a second control signal including charging enabled state (on) information for supplying the second power to the charging power port (e.g., VBUS) of the connection circuit 550 connected with the external electronic device 540. If the processor 520 determines that the charging function setting state of the electronic device is a charging disabled state, the processor 520 may transmit, to the low power control circuit 530, the second control signal including charging disabled (off) state information for cutting off the second power to the charging power port (e.g., VBUS) of the connection circuit 550 connected with the external electronic device 540.

According to an embodiment, the processor 520 may transmit, to the low power control circuit 530, the first control signal determined based on the third control signal indicating the unfolding state or folding state of the electronic device and the second control signal corresponding to the charging function setting state as illustrated by way of example in Table 7 below, thereby controlling the first power to the data input/output control circuit 531 and the second power to the charging power port (e.g., VBUS) of the connection circuit 550 connected with the external electronic device 540.

TABLE 7

| third control signal | second control signal | first power | second power |
|---|---|---|---|
| unfolding state | charging enabled (ON) | ON | ON |
| folding state | charging enabled (ON) | OFF | ON |

As shown in Table 7 above, upon receiving the third control signal including unfolding state information for the electronic device from the folding detection circuit 570, the processor 520 may include, in the first control signal, active state information for the electronic device for supplying the first power to the data input/output control circuit 531. The processor 520 may transmit, to the low power control circuit 530, the first control signal including the active state information for the electronic device for supplying the first power to the data input/output control circuit 531 and the second control signal including the charging enabled (on) state information for the electronic device according to the charging function setting state of the electronic device, thereby controlling to supply the first power (e.g., 3.3V) for the data communication port of the connection circuit 550 through the first power circuit 533 and to supply the second power (e.g., 5.0V) for the charging power port (e.g., VBUS) of the connection circuit 550 through the second power circuit 535. Upon receiving the third control signal including folding state information for the electronic device from the folding detection circuit 570, the processor 520 may include, in the first control signal, power saving state information for the electronic device for cutting the first power to the data input/output control circuit 531. The processor 520 may transmit, to the low power control circuit 530, the first control signal including the power saving state information for the electronic device for cutting off the first power to the data input/output control circuit 531 and the second control signal including the charging enabled (on) state information according to the charging function setting state of the electronic device, thereby controlling to cut off the first power (e.g., 3.3V) for the data communication port of the connection circuit 550 through the first power circuit 533 and to supply the second power (e.g., 5.0V) for the charging power port (e.g., VBUS) of the connection circuit 550 through the second power circuit 535.

According to an embodiment, if the processor 520 detects the unfolding state of the electronic device based on the third control signal received from the folding detection circuit 570 and determines that the power state of the electronic device is the power saving state in the unfolding state of the electronic device, the processor 520 may transmit, to the low power control circuit 530, the first control signal including the power saving state information for the electronic device, instead of the first control signal including the active state information for the electronic device, thereby controlling to cut off the first power to the data input/output control circuit 531 through the first power circuit 533.

According to an embodiment, for multi-foldable electronic devices, as well as single-foldable electronic devices, the processor 520 may control the first power to the data communication port of the connection circuit and/or the second power to the charging power port of the connection circuit for the external electronic device, in response to at least one folding/unfolding operation.

According to various embodiments, the low power control circuit 530 may include the data input/output control circuit 531, the first power circuit 533, and the second power circuit 535.

According to various embodiments, the data input/output control circuit 531 may perform the same or similar function as the data input/output control circuit 231 of FIG. 2.

According to various embodiments, the first power circuit 533 may operate in the same or similar manner as the first power circuit 233 of FIG. 2. If the first control signal including the active state information for the electronic device is received from the processor 520 based on the third control signal including the unfolding state information for the electronic device, the first power may be supplied to the data input/output control circuit 531 and, if the first control signal including the power saving state information for the electronic device is received from the processor 520 based on the third control signal including the folding state information for the electronic device, the first power to the data input/output control circuit 531 may be cut off.

According to various embodiments, the second power circuit 535 may operate in the same or similar manner as the second power circuit 235 of FIG. 2. If the second control signal including the charging enabled (on) state information for the electronic device is received from the processor 520, the second power to the charging power port (e.g., VBUS) of the connection circuit 550 connected with the external electronic device 540 may be supplied and, if the second control signal including the charging disabled (off) state information for the electronic device is received from the processor 520, the second power to the charging power port (e.g., VBUS) of the connection circuit 550 connected with the external electronic device 540 may be cut off.

According to various embodiments, the connection circuit 550 may perform the same or similar function as the connection circuit 250 of FIG. 2.

According to various embodiments, the folding detection circuit 570 may detect the folding state or unfolding state of the electronic device.

The folding detection circuit 570 is described below in greater detail with reference to FIG. 5B. According to an embodiment, the folding detection circuit 570 may detect an open action and a close action of a first housing 501a in the electronic device 501 including a first housing 501a and the second housing 501b, thereby detecting the folding state or unfolding state of the electronic device 501.

According to an embodiment, the folding detection circuit 570 may detect an open action and close action of an accessory device that protects the display included in the first housing 501a in the electronic device 501 including the first housing 501a and the second housing 501b, thereby detecting the folding state or unfolding state of the electronic device 501.

According to an embodiment, the folding detection circuit 570 may detect the folding angle of the electronic device 501 based on mutually measured data between a first motion sensor (e.g., a 9-axis acceleration sensor) 573a provided in the first housing 501a and a second motion sensor (e.g., a 9-axis acceleration sensor) 573b provided in the second housing 501b and, based on the detected folding angle, detect the folding state or unfolding state. For example, a first threshold for the folding state may be set to less than 0 degrees to 30 degrees, and a first threshold for the unfolding state may be set to 45 degrees or more to 360 degrees.

According to an embodiment, the folding detection circuit 570 may detect the folding state or unfolding state of the electronic device 501 through a change in magnetic field measured via the first motion sensor (e.g., a 9-axis acceleration sensor) 573a provided in the first housing 501a and a magnet 575 provided in the second housing 501b.

According to an embodiment, the folding detection circuit 570 may have a hall sensor (not shown) in the first housing 501a. When the magnet and the hall sensor approach each other, a high output signal, as the third control signal, may be transmitted to the processor 520 and, when the magnet and the hall sensor are positioned apart by a predetermined distance, a low output signal, as the third control signal, may be transmitted to the processor 520.

Figure 6A:
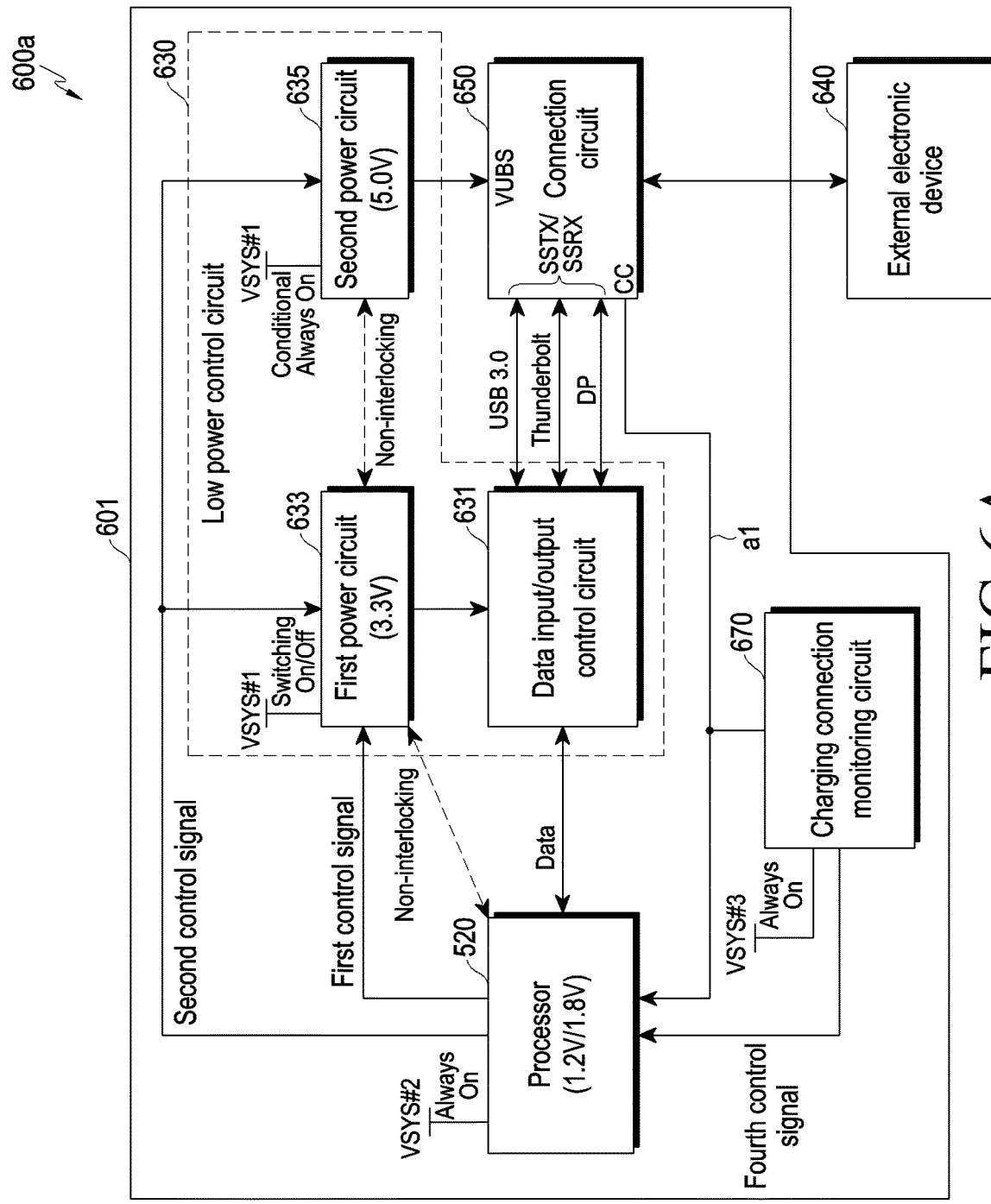
FIG. 6A is a block diagram illustrating an electronic device according to various embodiments.
Figure 6B:
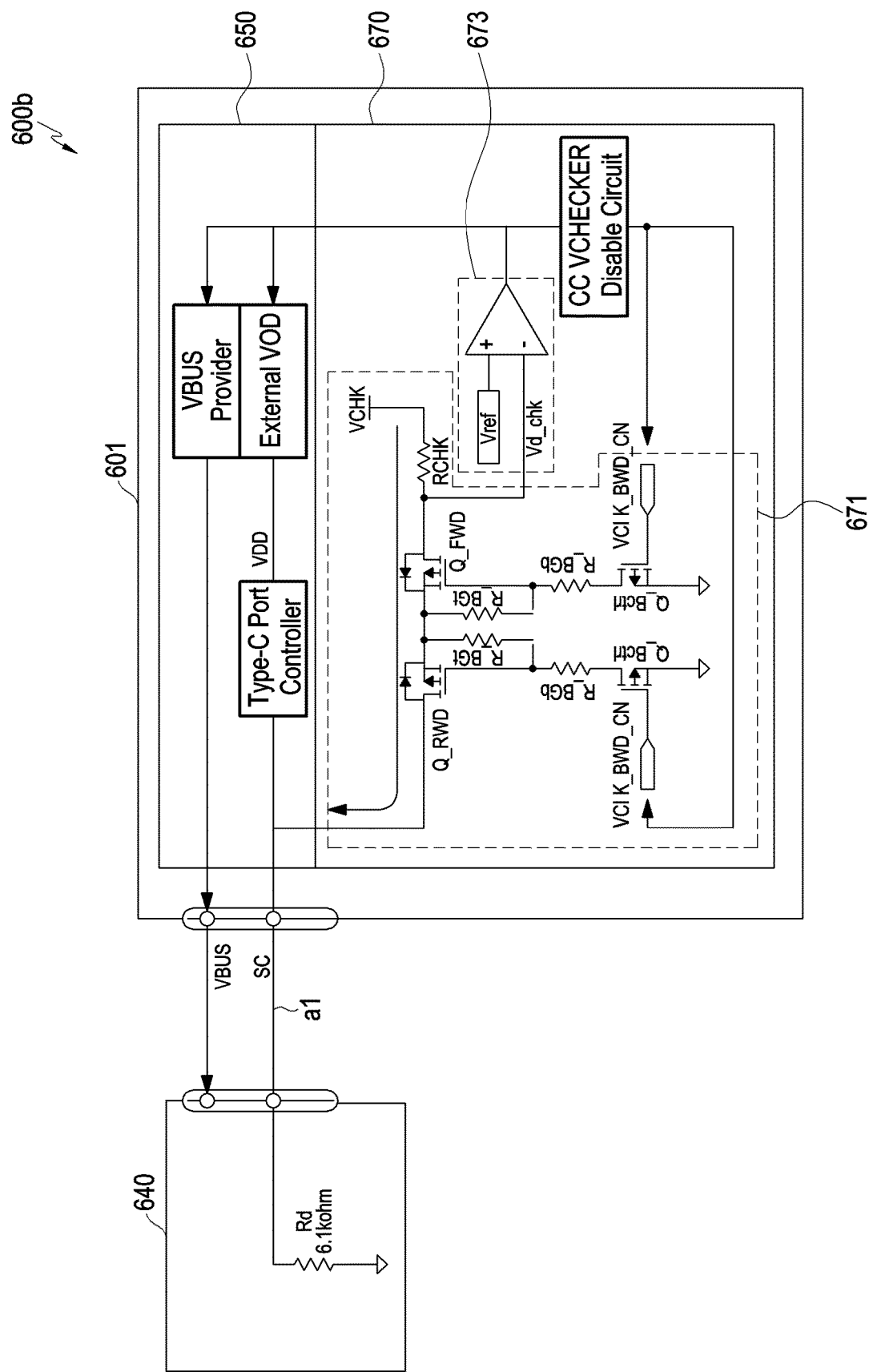
FIG. 6B is a circuit diagram illustrating a charging connection monitor circuit in an electronic device according to various embodiments.

FIG. 6A is a block diagram 600a illustrating an electronic device according to various embodiments. FIG. 6B is a circuit diagram 600b illustrating a charging connection monitor circuit in an electronic device according to various embodiments.

Referring to FIG. 6A, an electronic device 601 (e.g., the electronic device 101 of FIG. 1) may include a processor (e.g., including processing circuitry) 620, a low power control circuit 630, a connection circuit 650, and a charging connection monitoring circuit 670.

According to various embodiments, the processor 620 (e.g., the processor 120 of FIG. 1) may include various processing circuitry and control the overall operation of the electronic device.

According to an embodiment, the processor 620 may always receive power even in a power-off state of the electronic device and may transmit control signals corresponding to components of the electronic device.

According to an embodiment, the processor 620 may receive a fourth control signal including connection information for an external electronic device 640 from the charging connection monitoring circuit 670 configured to always receive power in the power-off state of the electronic device and, if the charging function setting state of the electronic device is determined as the charging enabled (on) state, transmit, to the low power control circuit 630, a second control signal including charging enabled state information for supplying second power to the charging power port (e.g., VBUS) of the connection circuit 650 connected with the external electronic device 640.

According to an embodiment, upon receiving the fourth control signal including disconnection information for the external electronic device 640 from the charging connection monitoring circuit 670 configured to always receive power in the power-off state of the electronic device, the processor 620 may automatically switch the charging function setting state from the charging enabled state to the charging disabled state and transmit, to the low power control circuit 630, the second control signal including the charging disabled state information for cutting off the second power to the charging power port (e.g., VBUS) of the connection circuit 650 connected with the external electronic device 640.

According to an embodiment, the processor 620 may control the second power to the charging power port (e.g., VBUS) of the connection circuit 650 connected with the external electronic device 640, based on the fourth control signal received from the charging connection monitoring circuit 670, in the power-off state of the electronic device as illustrated by way of example in Table 8 below.

TABLE 8

| fourth control signal | second control signal | first power | second power |
|---|---|---|---|
| connection of external electronic device | charging enabled (ON) | OFF | ON |
| disconnection of external electronic device | charging enabled (ON) | OFF | OFF |

As shown in Table 8 above, the processor 620 may receive the fourth control signal including the connection information for the external electronic device 640 from the charging connection monitoring circuit 670 and, if the charging function setting state of the electronic device is determined as the charging enabled (on) state, transmit, to the low power control circuit 630, the second control signal including the charging enabled (on) state information for the electronic device according to the charging function setting state of the electronic device, thereby controlling to supply the second power (e.g., 5.0V) for the charging power port (e.g., VBUS) of the connection circuit 650 through the second power circuit 635. Upon receiving the fourth control signal including the disconnection information for the external electronic device 640 from the charging connection monitoring circuit 670, the processor 620 may switch the charging function setting state of the electronic device from the charging enabled (on) state to the charging disabled (off) state and transmit, to the low power control circuit 630, the second control signal including the charging disabled (off) state information for the electronic device, thereby controlling to cut off the second power (e.g., 5.0V) for the charging power port (e.g., VBUS) of the connection circuit 650 through the second power circuit 635.

According to various embodiments, the low power control circuit 630 may include the data input/output control circuit 631, the first power circuit 633, and the second power circuit 635.

According to various embodiments, the data input/output control circuit 631 may perform the same or similar function as the data input/output control circuit 231 of FIG. 2.

According to various embodiments, the first power circuit 633 may operate in the same or similar manner as the first power circuit 233 of FIG. 2 and may cut off power supply to the data input/output control circuit 631 in the power-off state of the electronic device.

According to various embodiments, the second power circuit 635 may operate in the same or similar manner as the second power circuit 235 of FIG. 2. If the second control signal including the charging enabled (on) state information for the electronic device is received from the processor 620, the second power to the charging power port (e.g., VBUS) of the connection circuit 650 connected with the external electronic device 640 may be supplied and, if the second control signal including the charging disabled (off) state information for the electronic device is received from the processor 620, power supply to the charging power port (e.g., VBUS) of the connection circuit 650 connected with the external electronic device 640 may be cut off.

According to various embodiments, the connection circuit 650 may perform the same or similar function as the connection circuit 250 of FIG. 2.

According to various embodiments, the charging connection monitoring circuit 670 may receive power even in the power-off state of the electronic device and may detect connection and disconnection of an external electronic device to/from the connection circuit 650 and the device type of the external electronic device.

According to an embodiment, the charging connection monitoring circuit 670 may automatically determine a charging receiving device and a charging supplying device. For example, if the voltage value received from the connection circuit 650 is 6V and is recognized as the High-Z state, the charging connection monitoring circuit 670 may determine connection of a charging supplying device to the connection circuit 650. If the voltage value received from the connection circuit 650 is 2.8V and is recognized as the High state, the charging connection monitoring circuit 670 may determine connection of a charging receiving device to the connection circuit 650. If the voltage value received from the connection circuit 650 is 2.8V, the charging connection monitoring circuit 670 may determine that the charging receiving device has been disconnected from the connection circuit 650.

Referring to FIG. 6B, the charging connection monitoring circuit 670 may include a first circuit 671 for measuring the voltage value according to the terminating resistance received through the identification line (e.g., the cc line) and a second circuit 673 capable of identifying the device type of the external electronic device 640 connected to the connection circuit 650 based on the voltage value received from the first circuit 671.

According to an embodiment, the first circuit 671 may measure the voltage value according to the terminating resistance received through the identification line a1 (e.g., the CC line) connected between the external electronic device identification port (e.g., CC) of the connection circuit 650 and the processor 620. The first circuit 671 may transmit the measured voltage value through the identification line a1 (e.g., the CC line) to the second circuit 673.

According to an embodiment, the second circuit 673 may compare a threshold with the voltage value received from the first circuit 671, determine the connection state of the external electronic device 640 to the connection circuit 650, and identify the device type of the external electronic device 640 based on the voltage value. If the voltage value received from the first circuit 671 is the voltage value for the terminating resistance (e.g., Rd), the first circuit 671 may identify that the device type of the external electronic device is a charging receiving device and transmit, to the processor 620, a fourth control signal including connection information for the external electronic device 640.

According to an embodiment, if the voltage value according to the terminating resistance received from the first circuit 671 is "0," the second circuit 673 may transmit, to the processor 620, a fourth control signal including the disconnection information for the external electronic device 640.

Figure 7:
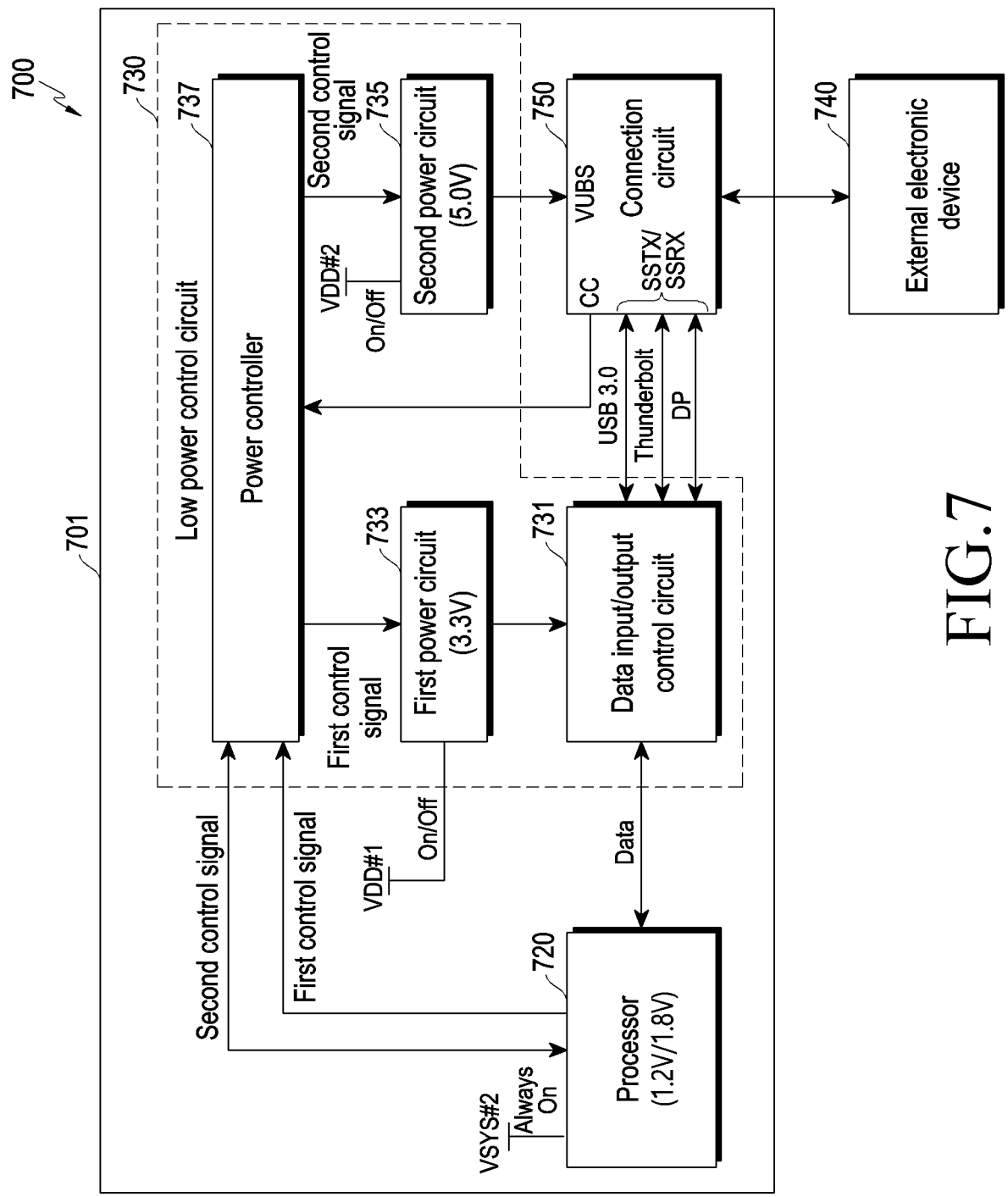
FIG. 7 is a block diagram illustrating an electronic device according to various embodiments.

FIG. 7 is a block diagram 700 illustrating an electronic device according to various embodiments.

Referring to FIG. 7, an electronic device 701 (e.g., the electronic device 101 of FIG. 1) may include a processor (e.g., including processing circuitry) 720, a low power control circuit 730, a power controller (e.g., including micro controller circuitry (MCU)) 737, and a connection circuit 750.

According to various embodiments, the processor 720 (e.g., the processor 120 of FIG. 1) may include various processing circuitry and control the overall operation of the electronic device, and the processor 720 may perform the same or similar function as the processor 220 of FIG. 2.

According to various embodiments, the low power control circuit 730 may include a data input/output control circuit 731, a first power circuit 733, a second power circuit 735, and a power controller 737.

According to various embodiments, the data input/output control circuit 731 may perform the same or similar function as the data input/output control circuit 231 of FIG. 2.

According to various embodiments, the first power circuit 733 may operate in the same or similar manner as the first power circuit 233 of FIG. 2 and may receive a first control signal including power state information for the electronic device from the power controller 737 and control the first power to the data input/output circuit 731 based on the first control signal.

According to various embodiments, the second power circuit 735 may operate in the same or similar manner as the second power circuit 235 of FIG. 2 and may receive the second control signal including charging function setting state information for the external electronic device 640 and control the second power to the charging power port (e.g., VBUS) of the connection circuit 750 connected with the external electronic device 740 based on the second control signal.

According to various embodiments, the power controller 737 may control the overall operation of the low power control circuit 730, and may transmit the first control signal received from the processor 720 to the first power circuit 733 and the second control signal received from the processor 720 to the second power circuit 735.

According to an embodiment, the power controller 737 may include various circuitry including at least one micro controller unit (MCU).

According to an embodiment, the power controller 737 may transmit, to the processor 720, the voltage value according to the terminating resistance received from the external electronic device identification port (e.g., CC) of the connection circuit 750 capable of identifying the device type of the external electronic device.

According to various embodiments, the power controller 737 may play a role as a power switch for supplying the connection circuit 750 with the second power output from the second power circuit 735 receiving the second control signal including the charging enabled state information from the processor 720. According to various embodiments, the connection circuit 750 may perform the same or similar function as the connection circuit 250 of FIG. 2.

According to an embodiment, the external electronic device identification port (e.g., CC) of the connection circuit 750 may be connected with the power controller 737 and, when the external electronic device 750 is connected to the connection circuit 750, transmit, to the power controller 737, the voltage value according to the terminating resistance received from the external electronic device 750.

Figure 8:
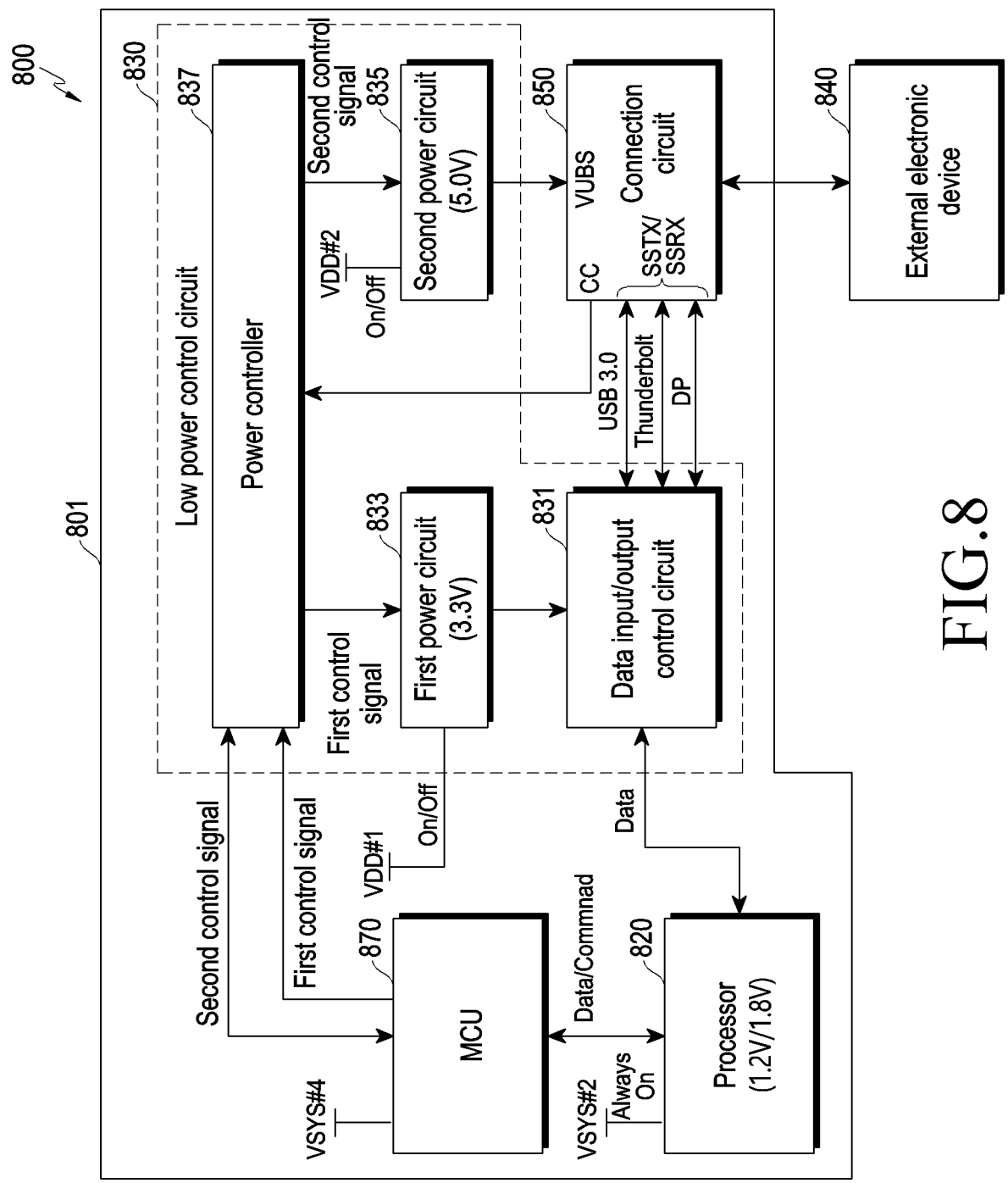
FIG. 8 is a block diagram illustrating an electronic device according to various embodiments.

FIG. 8 is a block diagram 800 illustrating an electronic device according to various embodiments.

Referring to FIG. 8, an electronic device 801 (e.g., the electronic device 101 of FIG. 1) may include a processor (e.g., including processing circuitry) 820, a micro controller unit (MCU) 870, a power controller 837, a low power control circuit 830, and a connection circuit 850.

According to various embodiments, the processor 820 (e.g., the processor 120 of FIG. 1) may control the overall operation of the electronic device.

According to an embodiment, the processor 820 may determine the power state of the electronic device and the charging function setting state for the external electronic device and transmit, to the micro controller unit 870, power state (e.g., active state, power saving state, or power-off state) information for the electronic device and charging function setting state (e.g., charging enabled state or charging disabled state) information for the external electronic device.

According to various embodiments, the micron controller unit (MCU) 870, as an embedded controller (EC), may control the low power control circuit 830 independently from the processor 820.

According to an embodiment, the micro controller unit 870 may transmit, to the low power control circuit 830, a first control signal including the power state information for the electronic device based on the power state (e.g., active state, power saving state, or power-off state) information for the electronic device received from the processor 820 and a second control signal including the charging function setting state information for the external electronic device based on the charging function setting state (e.g., charging enabled state or charging disabled state) information for the external electronic device received from the processor 820.

According to an embodiment, the micro controller unit 870 may transmit, to the processor 820, a voltage value according to a terminating resistance for indicating the device type of the external electronic device and the connection or disconnection of the external electronic device 840 received from the low power control circuit 830.

According to an embodiment, the micro controller unit 870, as a power controller capable of managing system power in response to state information received from the processor 820, may control the power (boot) sequence for the processor 820.

According to various embodiments, the low power control circuit 830 may include a data input/output control circuit 831, a first power circuit 833, a second power circuit 835, and a power controller 837.

According to various embodiments, the data input/output control circuit 831 may perform the same or similar function as the data input/output control circuit 231 of FIG. 2 and/or the data input/output control circuit 731 of FIG. 7.

According to various embodiments, the first power circuit may operate in the same or similar manner as the first power circuit 233 of FIG. 2 and/or the first power circuit 733 of FIG. 7.

According to various embodiments, the second power circuit 835 may operate in the same or similar manner as the second power circuit 235 of FIG. 2 and/or the second power circuit 735 of FIG. 7.

According to various embodiments, the power controller 837 may control the overall operation of the low power control circuit 830 and transmit the first control signal received from the micro controller unit 870 to the first power circuit 833 and the second control signal received from the micro controller unit 870 to the second power circuit 835.

According to an embodiment, the power controller 837 may transmit, to the micro controller unit 870, the voltage value according to the terminating resistance received from the external electronic device identification port (e.g., CC) of the connection circuit 850 for identifying the device type of the external electronic device and the connection of the external electronic device.

According to an embodiment, the power controller 837 may perform the same or similar function as the power controller 737 of FIG. 7.

According to various embodiments, the connection circuit 850 may perform the same or similar function as the connection circuit 250 of FIG. 2 and/or the connection circuit 750 of FIG. 7.

According to various example embodiments, an electronic device may comprise: a connection circuit (e.g., the connection circuit 250 of FIG. 2) configured to connect to an external electronic device, a processor (e.g., the processor 220 of FIG. 2) configured to: transmit, to a low power control circuit (e.g., the low power control circuit 230 of FIG. 2), a first control signal including power saving state information for the electronic device and a second control signal including charging enabled state information based on a power state of the electronic device being a power saving state, wherein a charging function setting state for the external electronic device is determined as a charging enabled state based on the external electronic device being connected to the connection circuit, and the low power control circuit is configured to cut off first power to a data input/output control circuit (e.g., the data input/output control circuit 231 of FIG. 2) based on the power saving state information for the electronic device included in the first control signal and to supply second power to the external electronic device connected to the connection circuit based on the charging enabled state information included in the second control signal.

According to various example embodiments, the processor may be configured to: identify a device type of the external electronic device based on the external electronic device being connected to the connection circuit and, based on the device type of the external electronic device being identified as a charging receiving device, determine the power state of the electronic device and the charging function setting state for the external electronic device.

According to various example embodiments, the electronic device may further comprise: a remaining battery measurement circuit (e.g., the remaining battery measurement circuit 470 of FIG. 4) configured to measure a remaining battery level of the electronic device. The processor may be configured to: compare a battery level threshold value with the remaining battery level measured by the remaining battery measurement circuit based on the power state of the electronic device being determined as a power saving state, and the charging function setting state for the external electronic device being determined as the charging enabled state, and based on the remaining battery level not being more than the battery level threshold value, switch the charging function setting state from the charging enabled state to a charging disabled state and transmit, to the low power control circuit, the first control signal including the power saving state information for the electronic device and the second control signal including charging disabled state information.

According to various example embodiments, based on the remaining battery level not being less than the battery level threshold value, the processor may be configured to transmit, to the low power control circuit, the first control signal including the power saving state information for the electronic device and the second control signal including the charging enabled state information.

According to various example embodiments, the processor may be configured to: start a charging supply timer (e.g., the charging supply timer 423 of FIG. 2) upon transmitting, to the low power control circuit, the first control signal including the power saving state information for the electronic device and the second control signal including the charging enabled state information, based on the charging supply timer being determined to expire, switch the charging function setting state from the charging enabled state to the charging disabled state, and transmit, to the low power control circuit, the first control signal including the power saving state information for the electronic device and the second control signal including the charging disabled state information.

According to various example embodiments, the low power control circuit may include a first power circuit (e.g., the first power circuit 233 of FIG. 2) configured to determine whether to supply the first power to the data input/output control circuit connected with a data communication port of the connection circuit based on the first control signal received from the processor and a second power circuit (e.g., the second power circuit 235 of FIG. 2) configured to determine whether to supply the second power to a charging power port of the connection circuit connected with the external electronic device based on the second control signal received from the processor.

According to various example embodiments, the first power circuit may be configured to supply the first power to the data input/output control circuit based on the first control signal being determined to include active state information for the electronic device, cut off the first power to the data input/output control circuit based on the first control signal being determined to include the power saving state information for the electronic device, and cut off the first power to the data input/output control circuit based on the first control signal being determined to include power off information for the electronic device.

According to various example embodiments, the first power circuit may include a retimer & bridge circuit.

According to various example embodiments, the second power circuit may be configured to supply the second power to the charging power port of the connection circuit based on the second control signal being determined to include the charging enabled state information and cut off the second power to the charging power port of the connection circuit based on the second control signal being determined to include the charging disabled state information.

According to various example embodiments, the electronic device may further comprise: a folding detection circuit (e.g., the folding detection circuit 570 of FIG. 5) configured to detect whether the electronic device is opened or closed. The processor may be configured to: determine that the electronic device is in a folding state based on a third control signal including folding state information received from the folding detection circuit and, based on the charging function setting state for the external electronic device being determined as the charging enabled state, and transmit, to the low power control circuit, the first control signal including the power saving state information for the electronic device and the second control signal including the charging enabled state information.

According to various example embodiments, the processor may be configured to: determine that the electronic device is an unfolding state based on the third control signal received from the folding detection circuit and, based on the charging function setting state for the external electronic device being determined as the charging enabled state, transmit, to the low power control circuit, the first control signal including the active state information for the electronic device and the second control signal including the charging enabled state information.

According to various example embodiments, the electronic device may further comprise: a charging connection monitoring circuit configured to detect whether the external electronic device is connected to the connection circuit in a power-off state of the electronic device. The processor may be configured to: receive a fourth control signal including connection information for the external electronic device from the charging connection monitoring circuit in a power-off state of the electronic device and, based on the charging function setting state for the external electronic device being determined as the charging enabled state, transmit, to the low power control circuit, the second control signal including the charging enabled state information and, based on receiving the fourth control signal including disconnection information for the external electronic device from the charging connection monitoring circuit, switch the charging function setting state from the charging enabled state to the charging disabled state and transmit, to the low power control circuit, the second control signal including the charging disabled state information.

According to various example embodiments, the charging connection monitoring circuit may be configured to identify a device type of the external electronic device connected to the connection circuit.

Figure 9:
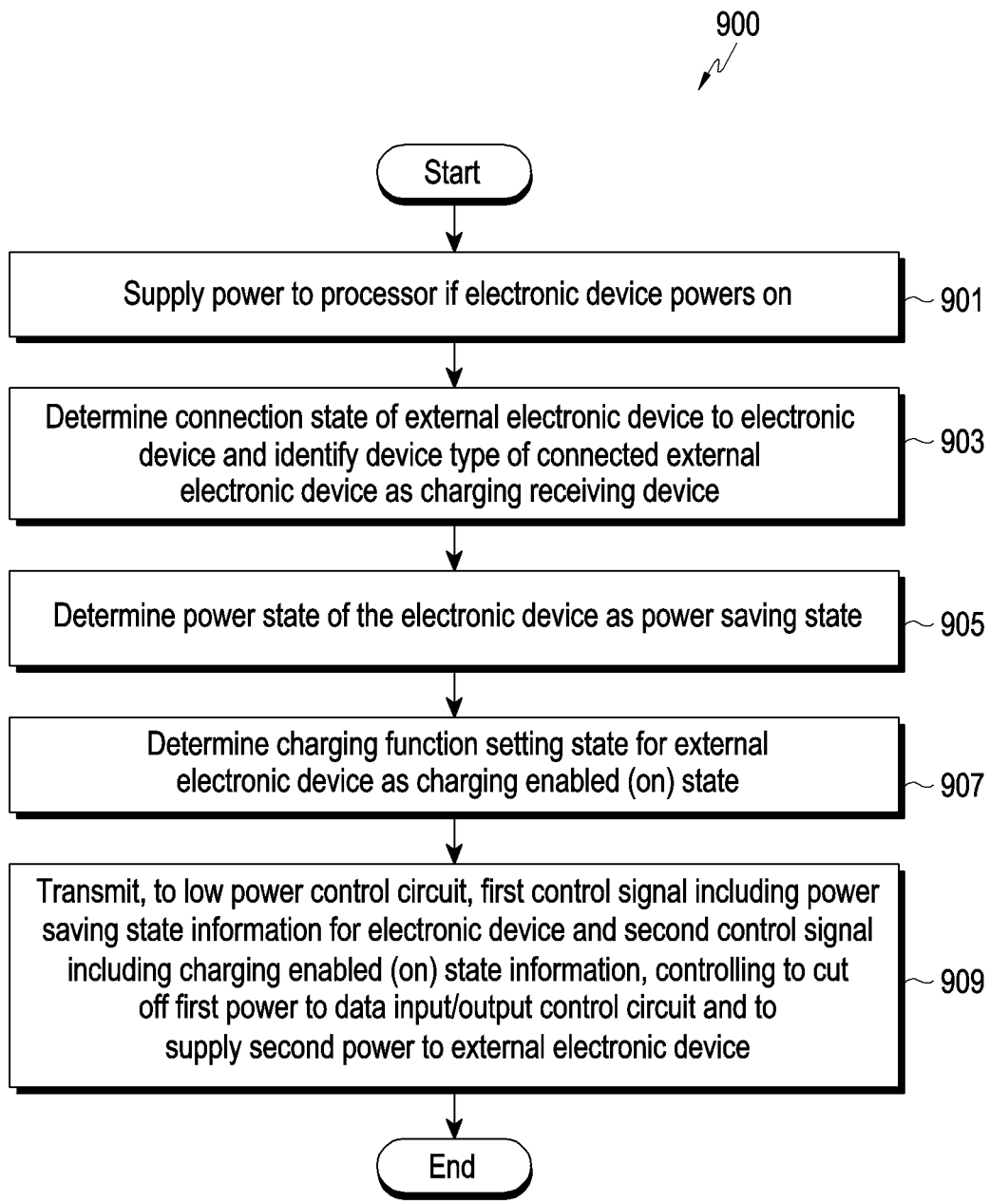
FIG. 9 is a flowchart illustrating an example operation of controlling power supply in an electronic device according to various embodiments.

FIG. 9 is a flowchart 900 illustrating an example operation of controlling power supply in an electronic device according to various embodiments. The operations of controlling power supply may include operations 901 to 909. According to an embodiment, at least one of operations 901 to 909 may be omitted or changed in order or may add other operations. The operations of controlling power supply may, for example, be performed by the electronic device 101 of FIG. 1, the processor 120 of FIG. 1, the electronic device 201 of FIG. 2, or the processor 220 of FIG. 2.

In operation 901, when the electronic device 201 is powered on, power may be supplied to the processor 220.

In operation 903, the electronic device 201 may determine a connection state of an external electronic device to the electronic device, and identify that the device type of the connected external electronic device is a charge receiving device.

According to an embodiment, the electronic device 201 may identify the connection state for the external electronic device based on the voltage value according to the terminating resistance received from the external electronic device identification port (e.g., CC) of the connection circuit 250 connected with the external electronic device 240 and identify that the device type of the connected external electronic device is the charging receiving device. For example, when the voltage value received from the external electronic device identification port (e.g., CC) is the voltage value according to the terminating resistance (e.g., Rd), the device type of the connected external electronic device may be identified as the charging receiving device.

In operation 905, the electronic device 201 may determine that the power state of the electronic device is the power saving state.

According to an embodiment, the electronic device 201 may determine the power state of the electronic device, e.g., one power state among the active state, power saving state, or power-off state.

In operation 907, the electronic device 201 may determine that the charging function setting state for the external electronic device is the charging enabled (on) state.

According to an embodiment, the electronic device 201 may determine that the charging enabled (on) state set by the user is the charging function setting state for the external electronic device.

In operation 909, the electronic device 201 may transmit, to the low power control circuit, the first control signal including the power saving state information for the electronic device and the second control signal including the charging enabled (on) state, thereby controlling to cut off the first power to the data input/output control circuit and to supply the second power to the external electronic device.

According to an embodiment, the electronic device 201 may transmit, to the first power circuit 233 of the low power control circuit 230, the first control signal including the power saving state information for the electronic device, thereby controlling to cut off the first power to the data input/output control circuit 231 through the first power circuit 233.

According to an embodiment, the electronic device 201 may transmit, to the second power circuit 235 of the low power control circuit 230, the second control signal including the charging enabled (on) state information, thereby controlling to supply the second power to the charging power port (e.g., VBUS) of the connection circuit 250 connected with the external electronic device 240 through the second power circuit 235.

Figure 10:
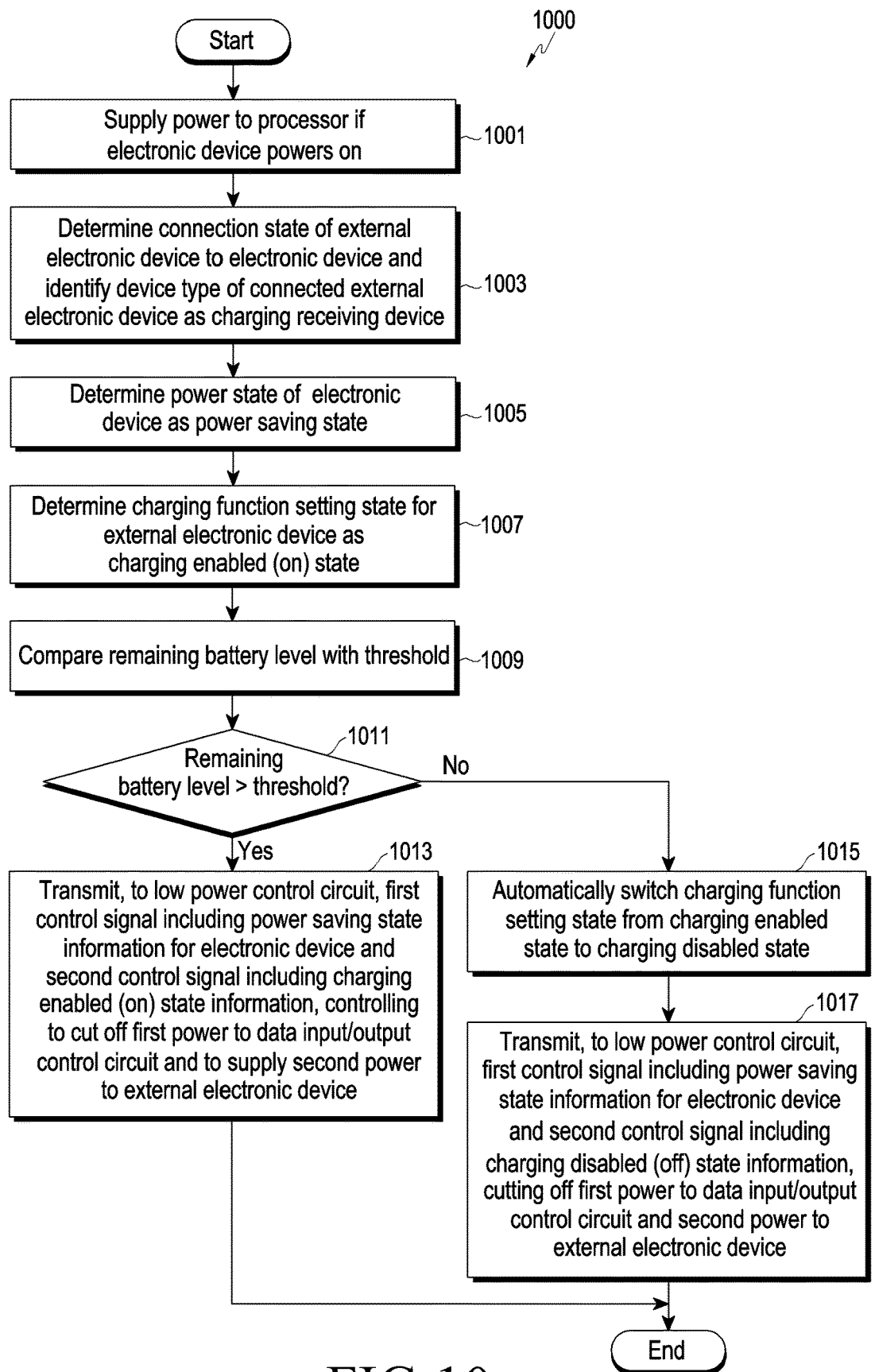
FIG. 10 is a flowchart illustrating an example operation of controlling power supply in an electronic device according to various embodiments.

FIG. 10 is a flowchart 1000 illustrating an example operation of controlling power supply in an electronic device according to various embodiments. The operations of controlling power supply may include operations 1001 to 1017. According to an embodiment, at least one of operations 1001 to 1017 may be omitted or changed in order or may add other operations. The operations of controlling power supply may, for example, be performed by the electronic device 101 of FIG. 1, the processor 120 of FIG. 1, the electronic device 401 of FIG. 4, or the processor 420 of FIG. 4.

In operation 1001, when the electronic device 401 is powered on, power may be supplied to the processor 420.

In operation 1003, the electronic device 401 may determine a connection state of an external electronic device to the electronic device, and identify that the device type of the connected external electronic device is a charge receiving device.

According to an embodiment, the electronic device 401 may determine the connection state of the external electronic device based on the voltage value according to the terminating resistance received from the external electronic device identification port (e.g., CC) of the connection circuit 450 connected with the external electronic device 440 and identify that the device type of the connected external electronic device is the charging receiving device. For example, when the voltage value received from the external electronic device identification port (e.g., CC) is the voltage value according to the terminating resistance (e.g., Rd), the device type of the connected external electronic device may be identified as the charging receiving device.

In operation 1005, the electronic device 401 may determine that the power state of the electronic device is the power saving state.

According to an embodiment, the electronic device 401 may determine the power state of the electronic device, e.g., one power state among the active state, power saving state, or power-off state.

In operation 1007, the electronic device 401 may determine that the charging function setting state for the external electronic device is the charging enabled (on) state.

According to an embodiment, the electronic device 401 may determine that the charging enabled (on) state set by the user is the charging function setting state for the external electronic device.

In operation 1009, the electronic device 401 may compare a threshold with the remaining battery level.

According to an embodiment, the electronic device 401 may determine the current remaining battery level of the electronic device measured by the remaining battery measurement circuit 470 and compare the threshold with the current remaining battery level of the electronic device measured by the remaining battery measurement circuit 470.

If the remaining battery level is determined greater than the threshold in operation 1011, the electronic device 401 may transmit, to the low power control circuit, the first control signal including the power saving state information for the electronic device and the second control signal including the charging enabled (on) state, thereby controlling to cut off the first power to the data input/output control circuit and to supply the second power to the external electronic device in operation 1013.

According to an embodiment, the electronic device 401 may transmit, to the first power circuit 433 of the low power control circuit 430, the first control signal including the power saving state information for the electronic device, thereby controlling to cut off the first power to the data input/output control circuit 431 through the first power circuit 433.

According to an embodiment, the electronic device 401 may transmit, to the second power circuit 435 of the low power control circuit 430, the second control signal including the charging enabled (on) state information, thereby controlling to supply the second power to the charging power port (e.g., VBUS) of the connection circuit 450 connected with the external electronic device 440 through the second power circuit 435.

If the remaining battery level is determined being less than or equal to the threshold, the electronic device 401 in operation 1011, the electronic device 401 may automatically switch the charging function setting state from the charging enabled state to the charging disabled state in operation 1015.

In operation 1017, the electronic device 401 may transmit, to the low power control circuit, the first control signal including the power saving state information for the electronic device and the second control signal including the charging disabled (off) state information, thereby controlling to cut off the first power to the data input/output control circuit and to cut off the second power to the external electronic device.

According to an embodiment, the electronic device 401 may transmit, to the first power circuit 433 of the low power control circuit 430, the first control signal including the power saving state information for the electronic device, thereby controlling to cut off the first power to the data input/output control circuit 431 through the first power circuit 433.

According to an embodiment, the electronic device 401 may transmit, to the second power circuit 435 of the low power control circuit 430, the second control signal including the charging disabled (off) state information, thereby controlling to cut off the second power to the charging power port (e.g., VBUS) of the connection circuit 450 connected with the external electronic device 440 through the second power circuit 435.

Figure 11:
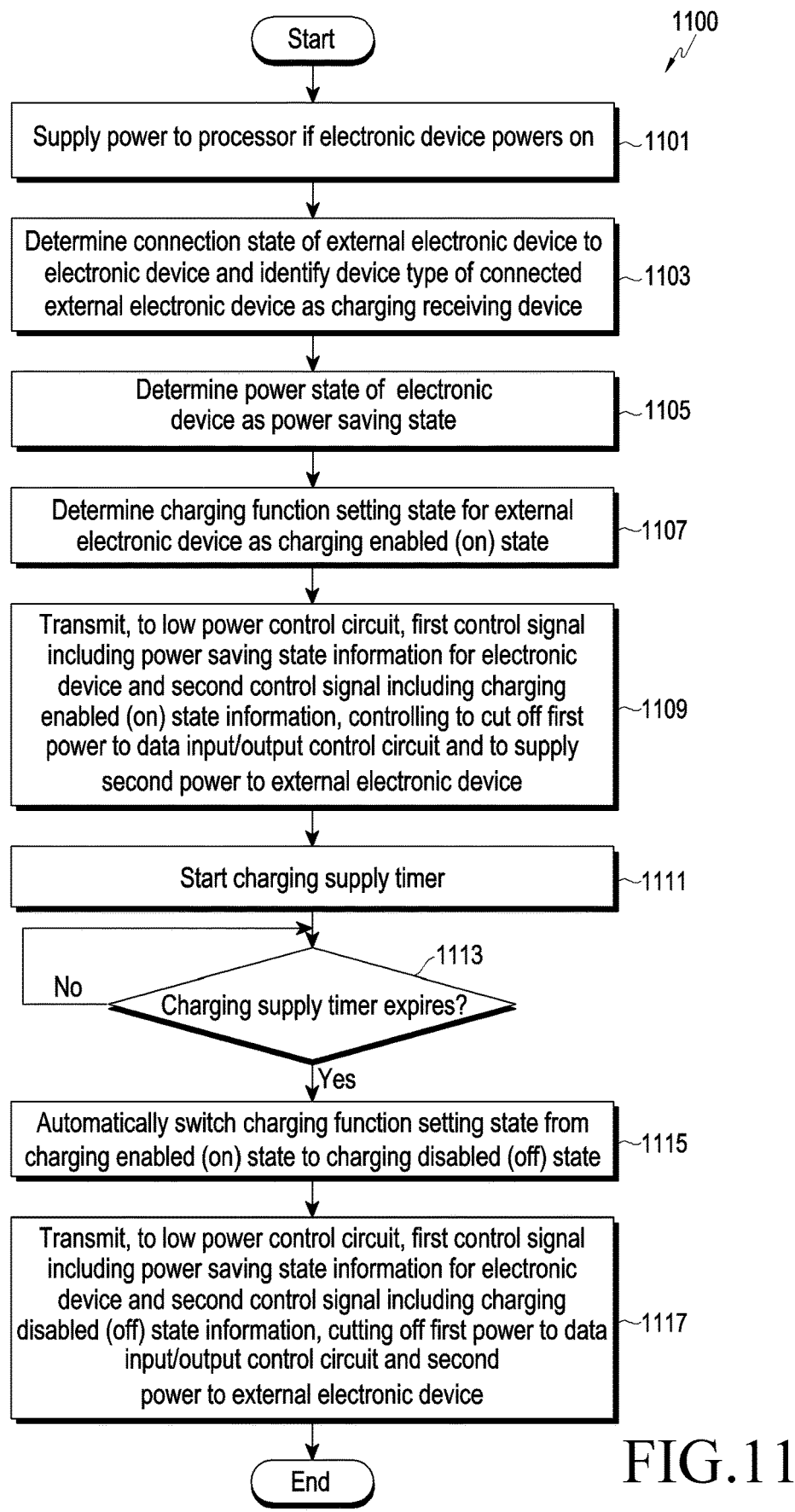
FIG. 11 is a flowchart illustrating an example operation of controlling power supply in an electronic device according to various embodiments.

FIG. 11 is a flowchart 1100 illustrating an example operation of controlling power supply in an electronic device according to various embodiments. The operations of controlling power supply may include operations 1101 to 1117. According to an embodiment, at least one of operations 1101 to 1117 may be omitted or changed in order or may add other operations. The operations of controlling power supply may, for example, be performed by the electronic device 101 of FIG. 1, the processor 120 of FIG. 1, the electronic device 401 of FIG. 4, or the processor 420 of FIG. 4.

In operation 1101, when the electronic device 401 is powered on, power may be supplied to the processor 420.

In operation 1103, the electronic device 401 may determine connection of an external electronic device to the electronic device, and identify that the device type of the connected external electronic device is a charge receiving device.

According to an embodiment, the electronic device 401 may determine the connection state of the external electronic device based on the voltage value according to the terminating resistance received from the external electronic device identification port (e.g., CC) of the connection circuit 450 connected with the external electronic device 440 and identify that the device type of the connected external electronic device is the charging receiving device. For example, when the voltage value received from the external electronic device identification port (e.g., CC) is the voltage value according to the terminating resistance (e.g., Rd), the device type of the connected external electronic device may be identified as the charging receiving device.

In operation 1105, the electronic device 401 may determine that the power state of the electronic device is the power saving state.

According to an embodiment, the electronic device 401 may determine the power state of the electronic device, e.g., one power state among the active state, power saving state, or power-off state.

In operation 1107, the electronic device 401 may determine that the charging function setting state for the external electronic device is the charging enabled (on) state.

According to an embodiment, the electronic device 401 may determine that the charging enabled (on) state set by the user is the charging function setting state for the external electronic device.

In operation 1109, the electronic device 401 may transmit, to the low power control circuit, the first control signal including the power saving state information for the electronic device and the second control signal including the charging enabled (on) state information, thereby controlling to cut off (off) the first power to the data input/output control circuit and to supply (on) the second power to the external electronic device.

According to an embodiment, the electronic device 401 may transmit, to the first power circuit 433 of the low power control circuit 430, the first control signal including the power saving state information for the electronic device, thereby controlling to cut off the first power to the data input/output control circuit 431 through the first power circuit 433.

According to an embodiment, the electronic device 401 may transmit, to the second power circuit 435 of the low power control circuit 430, the second control signal including the charging enabled (on) state information, thereby controlling to supply the second power to the charging power port (e.g., VBUS) of the connection circuit 450 connected with the external electronic device 440 through the second power circuit 435.

In operation 1111, the electronic device 401 may start a charging supply timer.

According to an embodiment, upon transmitting the first control signal and the second control signal to the low power control circuit 430, the electronic device 401 may operate the charging supply timer 423 and check the expiration of the charging supply timer 423.

In operation 1113, upon determining that the charging supply timer expires, the electronic device 401 may stop the operation of the charging supply timer and, in operation 1115, automatically switch the charging function setting state from the charging enabled state to the charging disabled state.

In operation 1117, the electronic device 401 may transmit, to the low power control circuit, the first control signal including the power saving state information for the electronic device and the second control signal including the charging disabled (off) state information, thereby controlling to cut off the first power to the data input/output control circuit and to cut off the second power to the external electronic device.

According to an embodiment, the electronic device 401 may transmit, to the first power circuit 433 of the low power control circuit 430, the first control signal including the power saving state information for the electronic device, thereby controlling to cut off the first power to the data input/output control circuit 431 through the first power circuit 433.

According to an embodiment, the electronic device 401 may transmit, to the second power circuit 435 of the low power control circuit 430, the second control signal including the charging disabled (off) state information, thereby controlling to cut off the second power to the charging power port (e.g., VBUS) of the connection circuit 450 connected with the external electronic device 440 through the second power circuit 435.

Figure 12:
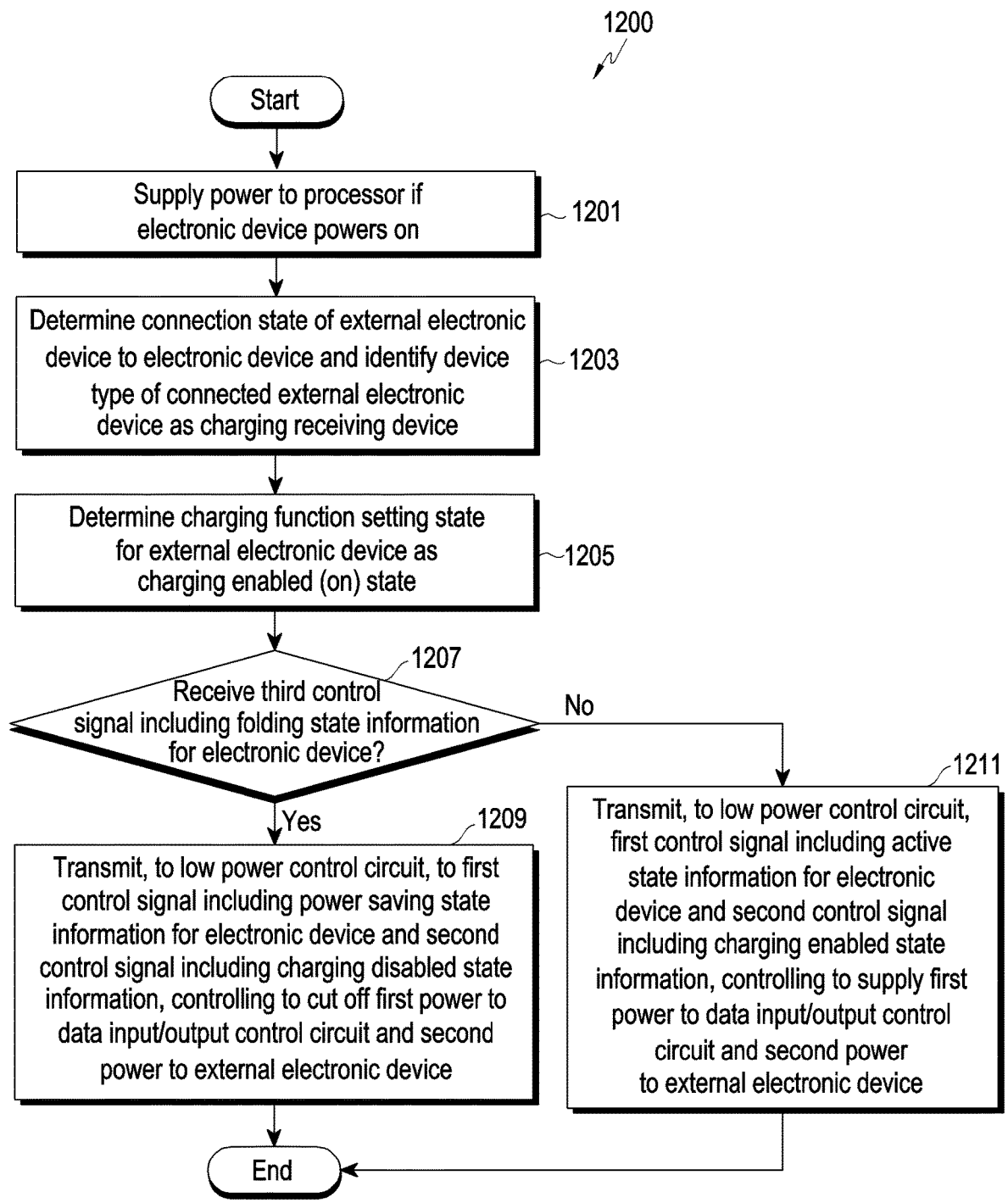
FIG. 12 is a flowchart illustrating an example operation of controlling power supply in an electronic device according to various embodiments.

FIG. 12 is a flowchart 1200 illustrating an example operation of controlling power supply in an electronic device according to various embodiments. The operations of controlling power supply may include operations 1201 to 1211. According to an embodiment, at least one of operations 1201 to 1211 may be omitted or changed in order or may add other operations. The operations of controlling power supply may, for example, be performed by the electronic device 101 of FIG. 1, the processor 120 of FIG. 1, the electronic device 501 of FIG. 5A, or the processor 520 of FIG. 5A.

In operation 1201, when the electronic device 501 is powered on, power may be supplied to the processor 520.

In operation 1203, the electronic device 501 may determine connection of an external electronic device to the electronic device, and identify that the device type of the connected external electronic device is a charge receiving device.

According to an embodiment, the electronic device 501 may determine the connection of the external electronic device based on the voltage value according to the terminating resistance (e.g., Rd) received from the external electronic device identification port (e.g., CC) of the connection circuit 550 connected with the external electronic device 540 and identify that the device type of the connected external electronic device is the charging receiving device. For example, when the voltage value received from the external electronic device identification port (e.g., CC) is the voltage value according to the terminating resistance (e.g., Rd), the device type of the connected external electronic device may be identified as the charging receiving device.

In operation 1205, the electronic device 501 may determine that the charging function setting state for the external electronic device is the charging enabled (on) state.

According to an embodiment, the electronic device 501 may determine that the charging enabled (on) state set by the user is the charging function setting state for the external electronic device.

In operation 1207, the electronic device 501 may determine whether to receive a third control signal including the folding state information for the electronic device.

According to an embodiment, the electronic device 501 may receive the third control signal including the folding state information for the electronic device from the folding detection circuit 570.

If it is determined that the third control signal including the folding state information for the electronic device is received in operation 1207, the electronic device 501 may transmit, to the low power control circuit, the first control signal including the power saving state information for the electronic device and the second control signal including the charging disabled (off) state information, thereby controlling to cut off the first power to the data input/output control circuit and to cut off the second power to the external electronic device, in operation 1209.

According to an embodiment, the electronic device 501 may transmit, to the first power circuit 533 of the low power control circuit 530, the first control signal including the power saving state information for the electronic device, thereby controlling to cut off the first power to the data input/output control circuit 431 through the first power circuit 533.

According to an embodiment, the electronic device 501 may transmit, to the second power circuit 535 of the low power control circuit 530, the second control signal including the charging disabled (off) state information, thereby controlling to cut off the second power to the charging power port (e.g., VBUS) of the connection circuit 550 connected with the external electronic device 540 through the second power circuit 535.

If it is determined that the third control signal including the unfolding state information for the electronic device is not received in operation 1207, the electronic device 501 may transmit, to the low power control circuit, the first control signal including the active state information for the electronic device and the second control signal including the charging enabled (on) state information, thereby controlling to supply the first power to the data input/output control circuit and to supply the second power to the external electronic device, in operation 1211.

According to an embodiment, the electronic device 501 may transmit, to the first power circuit 533 of the low power control circuit 530, the first control signal including the active state information for the electronic device, thereby controlling to supply the first power to the data input/output control circuit 531 through the first power circuit 533.

According to an embodiment, the electronic device 501 may transmit, to the second power circuit 535 of the low power control circuit 530, the second control signal including the charging enabled (on) state information, thereby controlling to supply the second power to the charging power port (e.g., VBUS) of the connection circuit 550 connected with the external electronic device 540 through the second power circuit 535.

Figure 13:
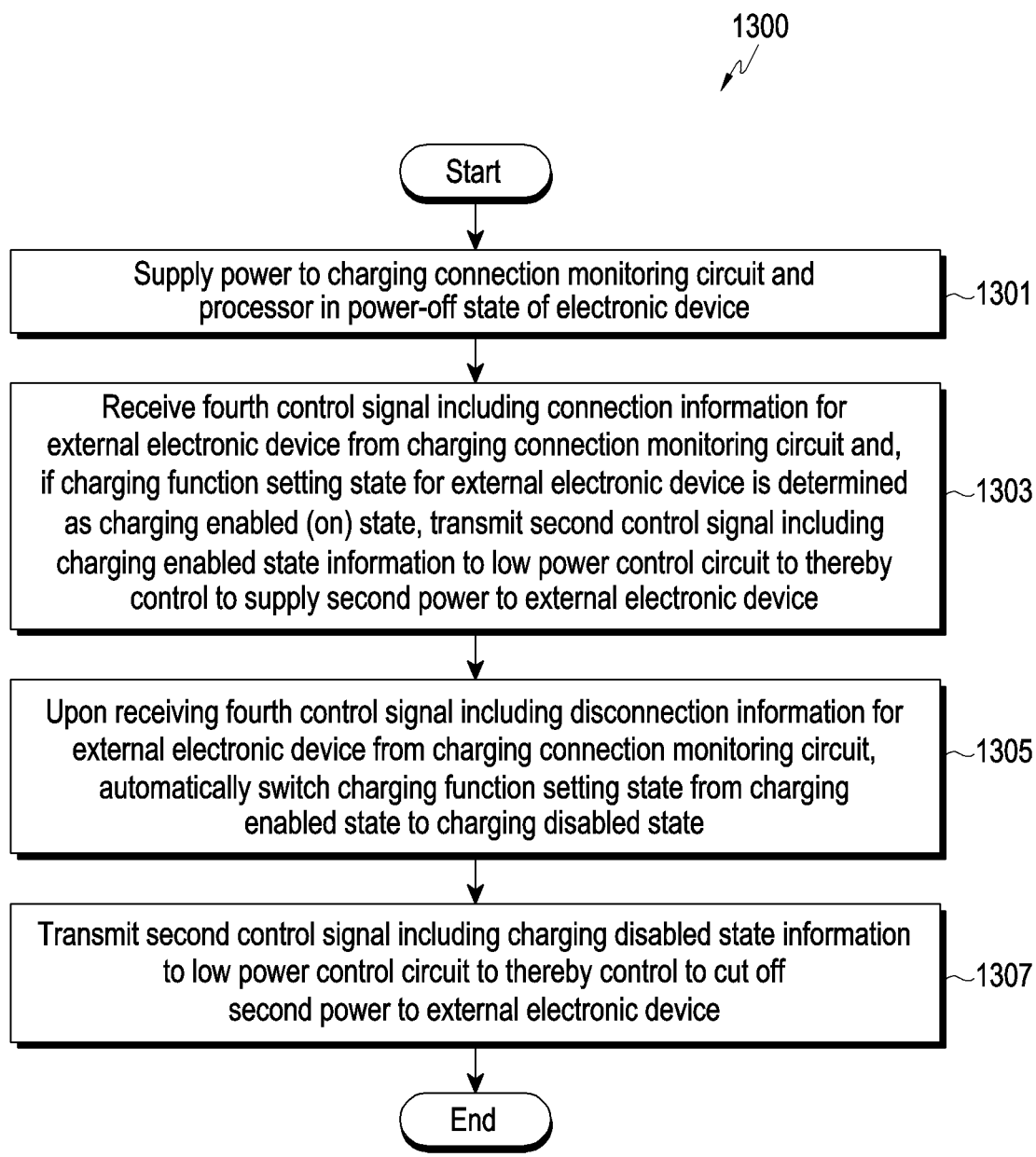
FIG. 13 is a flowchart illustrating an example operation of controlling power supply in an electronic device according to various embodiments.

FIG. 13 is a flowchart 1300 illustrating an example operation of controlling power supply in an electronic device according to various embodiments. The operations of controlling power supply may include operations 1301 to 1307. According to an embodiment, at least one of operations 1301 to 1307 may be omitted or changed in order or may add other operations. The operations of controlling power supply may, for example, be performed by the electronic device 101 of FIG. 1, the processor 120 of FIG. 1, the electronic device 601 of FIG. 6, or the processor 620 of FIG. 6.

In operation 1301, power may be supplied to the processor and the charging connection monitoring circuit in the power-off state of the electronic device 601.

According to an embodiment, power may be supplied to the processor 620 and the charging connection monitoring circuit 670 for detecting connection and disconnection of the external electronic device 640 to the connection circuit 650 in the power-off state of the electronic device 601.

In operation 1303, the electronic device 601 may receive a fourth control signal including the connection information for the external electronic device 640 from the charging connection monitoring circuit 670 and, if the charging function setting state for the external electronic device is determined as the charging enabled (on) state, transmit the second control signal including the charging enabled state information to the low power control circuit, thereby controlling to supply the second power to the external electronic device.

According to an embodiment, the electronic device 601 may transmit, to the second power circuit 635 of the low power control circuit 630, the second control signal including the charging enabled (on) state information, thereby controlling to supply the second power to the charging power port (e.g., VBUS) of the connection circuit 650 connected with the external electronic device 640 through the second power circuit 635.

In operation 1305, upon receiving the fourth control signal including the disconnection information for the external electronic device 640 from the charging connection monitoring circuit 670, the electronic device 601 may switch the charging function setting state from the charging enabled (on) state to the charging disabled (off) state.

In operation 1307, the electronic device 601 may transmit the second control signal including the charging disabled state information to the low power control circuit, thereby controlling to cut off the second power.

According to an embodiment, the electronic device 601 may transmit, to the second power circuit 635 of the low power control circuit 630, the second control signal including the charging disabled (off) state information, thereby controlling to cut off the second power to the charging power port (e.g., VBUS) of the connection circuit 650 connected with the external electronic device 640 through the second power circuit 635.

According to various example embodiments, a method for controlling power supply by an electronic device comprises: determining a charging function setting state for an external electronic device and a power state of the electronic device based on the external electronic device being connected to a connection circuit of the electronic device and transmitting, to a low power control circuit of the electronic device, a first control signal including power saving state information for the electronic device and a second control signal including charging enabled state information based on the power state of the electronic device being a power saving state, and the charging function setting state for the external electronic device being determined as a charging enabled state. The first control signal including the power saving state information for the electronic device may include a signal to allow the low power control circuit to cut off first power to a data input/output control circuit connected with a data communication port of the connection circuit, and the second control signal including the charging enabled state information may be a signal to allow the low power control circuit to supply second power to the external electronic device.

According to various example embodiments, the method may further comprise identifying a device type of the external electronic device based on the external electronic device being connected to the connection circuit and, based on the device type of the external electronic device being identified as a charging receiving device, determining the power state of the electronic device and the charging function setting state for the external electronic device.

According to various example embodiments, the method may further comprise comparing a threshold value with a remaining battery level of the electronic device based on the power state of the electronic device being determined as a power saving state, and the charging function setting state for the external electronic device being determined as the charging enabled state, based on the remaining battery level being less than or equal to the threshold value, switching the charging function setting state from the charging enabled state to a charging disabled state and transmitting, to the low power control circuit, a first control signal including the power saving state information for the electronic device and a second control signal including charging disabled state information, and based on the remaining battery level being greater than the threshold value, transmitting, to the low power control circuit, a first control signal including the power saving state information for the electronic device and a second control signal including the charging enabled state information.

According to various example embodiments, the method may further comprise starting a charging supply timer upon transmitting, to the low power control circuit, a first control signal including the power saving state information for the electronic device and a second control signal including the charging enabled state information, based on the charging supply timer being determined to expire, switching the charging function setting state from the charging enabled state to the charging disabled state, and transmitting, to the low power control circuit, a first control signal including the power saving state information for the electronic device and a second control signal including the charging disabled state information.

According to various example embodiments, the method may further comprise: receiving a third control signal including folding state information by the electronic device, determining that the electronic device is in a folding state based on the third control signal and, based on the charging function setting state for the external electronic device being determined as the charging enabled state, transmitting, to the low power control circuit, a first control signal including the power saving state information for the electronic device and a second control signal including the charging enabled state information.

According to various example embodiments, the method may further comprise: receiving a third control signal including folding state information by the electronic device, determining that the electronic device is an unfolding state based on the third control signal and, based on the charging function setting state for the external electronic device being determined as the charging enabled state, transmitting, to the low power control circuit, a first control signal including the active state information for the electronic device and a second control signal including the charging enabled state information.

According to various example embodiments, the method may further comprise receiving a fourth control signal including connection information for the external electronic device from a charging connection monitoring circuit in a power-off state of the electronic device and, based on the charging function setting state for the external electronic device being determined as the charging enabled state, transmitting, to the low power control circuit, a second control signal including the charging enabled state information and, based on receiving a fourth control signal including disconnection information for the external electronic device from the charging connection monitoring circuit, switching the charging function setting state from the charging enabled state to the charging disabled state and transmitting, to the low power control circuit, a second control signal including the charging disabled state information.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents.

What is claimed is:

1. An electronic device, comprising:
   a connection circuit configured to connect to an external electronic device;
   a display;
   a low power control circuit; and
   at least one processor, comprising processing circuitry, individually and/or collectively configured to:
   recognize connection of the external electronic device to the connection circuit,
   determine a power state of the electronic device based on whether the display is on or off in a power-on state,
   control to transmit, to the low power control circuit, a first control signal including active state information or power saving state information for the electronic device based on the power state of the electronic device, wherein the first control signal includes the active state information based on the power state of the electronic device being an active state where the display is on in the power-on state, or the power saving state information based on the power state of the electronic device being a power saving mode where the display is off in the power-on state, and
   control to transmit, to the low power control circuit, a second control signal including, charging enabled state information based on a charging function setting state for the external electronic device being determined as a charging enabled state, and
   wherein the low power control circuit is configured to:
   supply first voltage to a data input/output control circuit, based on the active state information for the electronic device included in the first control signal, cut off the first voltage to the data input/output control circuit, based on the power saving state information for the electronic device included in the first control signal, and supply second voltage, higher than the first voltage, to the external electronic device connected to the connection circuit, based on the charging enabled state information included in the second control signal, and wherein the at least one processor is individually and/or collectively configured to: based on a predetermined time being expired while the second voltage is supplied to the external electronic device, cut off the second voltage to the external electronic device, wherein the predetermined time is to be started based on the first control signal including the power saving state information for the electronic device for cutting off the first voltage to the data input/output control circuit.

2. The electronic device of claim 1, wherein the at least one processor is configured to: identify a device type of the external electronic device based on the external electronic device being connected to the connection circuit and, based on the device type of the external electronic device being identified as a charging receiving device, determine the power state of the electronic device and the charging function setting state for the external electronic device.

3. The electronic device of claim 1, further comprising: a remaining battery measurement circuit configured to measure a remaining battery level of the electronic device, wherein the at least one processor is configured to:

compare a threshold battery level value with the remaining battery level measured by the remaining battery measurement circuit based on the power state of the electronic device being determined as a power saving state, and the charging function setting state for the external electronic device being determined as the charging enabled state;

based on the remaining battery level being less than or equal to the threshold battery level value, switch the charging function setting state from the charging enabled state to a charging disabled state and transmit, to the low power control circuit, a first control signal including the power saving state information for the electronic device and a second control signal including charging disabled state information; and based on the remaining battery level being greater than the threshold battery level value, transmit, to the low power control circuit, a first control signal including the power saving state information for the electronic device and a second control signal including the charging enabled state information.

4. The electronic device of claim 1, wherein the at least one processor is configured to:

start a charging supply timer of the predetermined time based on transmitting, to the low power control circuit, the first control signal including the power saving state information for the electronic device and the second control signal including the charging enabled state information;

based on determining that the charging supply timer expires, switch the charging function setting state from the charging enabled state to a charging disabled state; and transmit, to the low power control circuit, the first control signal including the power saving state information for the electronic device and a second control signal including charging disabled state information.

5. The electronic device of claim 1, wherein the low power control circuit includes:

a first power circuit configured to determine whether to supply the first voltage to the data input/output control circuit connected with a data communication port of the connection circuit based on a first control signal received from the at least one processor; and a second power circuit configured to determine whether to supply the second voltage to a charging power port of the connection circuit connected with the external electronic device based on a second control signal received from the at least one processor.

6. The electronic device of claim 5, wherein the first power circuit is configured to:

supply the first voltage to the data input/output control circuit based on the first control signal being determined to include active state information for the electronic device;

cut off the first voltage to the data input/output control circuit based on the first control signal being determined to include the power saving state information for the electronic device; and cut off the first voltage to the data input/output control circuit based on the first control signal being determined to include power off information for the electronic device.

7. The electronic device of claim 5, wherein the second power circuit is configured to:

supply the second voltage to the charging power port of the connection circuit based on a second control signal being determined to include the charging enabled state information; and cut off the second voltage to the charging power port of the connection circuit based on a second control signal being determined to include the charging disabled state information.

8. The electronic device of claim 1, further comprising a folding detection circuit configured to detect whether the electronic device is open or closed, wherein the at least one processor is configured to:

determine that the electronic device is in a folded state based on a third control signal including folding state information received from the folding detection circuit and, based on the charging function setting state for the external electronic device being determined as the charging enabled state, transmit, to the low power control circuit, a first control signal including the power saving state information for the electronic device and a second control signal including the charging enabled state information; and determine that the electronic device is an unfolded state based on the third control signal received from the folding detection circuit and, based on the charging function setting state for the external electronic device being determined as the charging enabled state, transmit, to the low power control circuit, a first control signal including active state information for the electronic device and a second control signal including the charging enabled state information.

9. The electronic device of claim 1, further comprising a charging connection monitoring circuit configured to detect whether the external electronic device is connected to the connection circuit in a power-off state of the electronic device, wherein the at least one processor is configured to:

receive a fourth control signal including connection information for the external electronic device from the charging connection monitoring circuit in a power-off state of the electronic device and, based on the charging function setting state for the external electronic device being determined as the charging enabled state, transmit, to the low power control circuit, a second control signal including the charging enabled state information; and based on receiving a fourth control signal including disconnection information for the external electronic device from the charging connection monitoring circuit, switch the charging function setting state from the charging enabled state to a charging disabled state and transmit, to the low power control circuit, a second control signal including charging disabled state information, wherein the charging connection monitoring circuit is configured to identify a device type of the external electronic device connected to the connection circuit.

10. A method for controlling power supply by an electronic device, the method comprising:

determining, based on an external electronic device being connected to a connection circuit of the electronic device, a charging function setting state for the external electronic device and a power state of the electronic device based on whether a display of the electronic device is on or off in a power-on state; and transmitting, to a low power control circuit of the electronic device, a first control signal including active state information or power saving state information for the electronic device based on the power state of the electronic device, wherein the first control signal includes the active state information based on the power state of the electronic device being an active state where the display is on in the power-on state, or the power saving state information based on the power state of the electronic device being a power saving mode where the display is off in the power-on state, transmitting, to a low power control circuit of the electronic device, a second control signal including charging enabled state information based on the charging function setting state for the external electronic device being determined as a charging enabled state, supplying, by the low power control circuit, first voltage to a data input/output control circuit, based on the active state information for the electronic device included in the first control signal, cutting off, by the low power control circuit, the first voltage to the data input/output control circuit connected with a data communication port of the connection circuit, based on the power saving state information for the electronic device included in the first control signal, supplying, by the low power control circuit, second voltage, higher than the first voltage, to the external electronic device connected to the connection circuit, based on the charging enabled state information included in the second control signal, and cutting off, based on a predetermined time being expired while the second voltage is supplied to the external electronic device, the second voltage to the external electronic device, wherein the predetermined time is started based on the first control signal including the power saving state information for the electronic device for cutting off the first voltage to the data input/output control circuit.

11. The method of claim 10, further comprising:
identifying a device type of the external electronic device based on the external electronic device being connected to the connection circuit; and
based on the device type of the external electronic device being identified as a charging receiving device, determining the power state of the electronic device and the charging function setting state for the external electronic device.

12. The method of claim 10, further comprising:
comparing a threshold battery level value with a remaining battery level of the electronic device based on the power state of the electronic device being determined as a power saving state, and the charging function setting state for the external electronic device being determined as the charging enabled state;
based on the remaining battery level being less than or equal to the threshold battery level value, switching the charging function setting state from the charging enabled state to a charging disabled state and transmitting, to the low power control circuit, a first control signal including the power saving state information for the electronic device and a second control signal including charging disabled state information; and
based on the remaining battery level being greater than the threshold battery level value, transmitting, to the low power control circuit, a first control signal including the power saving state information for the electronic device and a second control signal including the charging enabled state information.

13. The method of claim 10, further comprising:
starting a charging supply timer of the predetermined time based on transmitting, to the low power control circuit, the first control signal including the power saving state information for the electronic device and the second control signal including the charging enabled state information;
based on determining that the charging supply timer expires, switching the charging function setting state from the charging enabled state to a charging disabled state; and transmitting, to the low power control circuit, the first control signal including the power saving state information for the electronic device and a second control signal including charging disabled state information.

14. The method of claim 10, further comprising:
receiving a third control signal including folding state information by the electronic device, determining that the electronic device is in a folding state based on the third control signal and, based on the charging function setting state for the external electronic device being determined as the charging enabled state, transmitting, to the low power control circuit, a first control signal including the power saving state information for the electronic device and a second control signal including the charging enabled state information; and
determining that the electronic device is an unfolding state based on the third control signal and, based on the charging function setting state for the external electronic device being determined as the charging enabled state, transmitting, to the low power control circuit, a first control signal including active state information for the electronic device and a second control signal including the charging enabled state information.

15. The method of claim 10, further comprising:
receiving a fourth control signal including connection information for the external electronic device from a charging connection monitoring circuit in a power-off state of the electronic device and, based on the charging function setting state for the external electronic device is determined as the charging enabled state, transmitting, to the low power control circuit, a second control signal including the charging enabled state information; and based on receiving a fourth control signal including disconnection information for the external electronic device from the charging connection monitoring circuit, switching the charging function setting state from the charging enabled state to a charging disabled state and transmitting, to the low power control circuit, a second control signal including charging disabled state information.

\* \* \* \* \*